(12) United States Patent
Omar et al.

(10) Patent No.: US 8,578,057 B2
(45) Date of Patent: *Nov. 5, 2013

(54) SYSTEM AND METHOD FOR PROVIDING REMOTE DATA ACCESS FOR A MOBILE COMMUNICATION DEVICE

(75) Inventors: Salim H. Omar, Waterloo (CA); Russell N. Owen, Waterloo (CA); Herbert A. Little, Waterloo (CA); Tomasz K. Rybak, Waterloo (CA); Michael S. Brown, Waterloo (CA); David P. Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 756 days.

This patent is subject to a terminal disclaimer.

(21) Appl. No.: 12/363,220

(22) Filed: Jan. 30, 2009

(65) Prior Publication Data

US 2009/0210936 A1    Aug. 20, 2009

Related U.S. Application Data

(63) Continuation of application No. 10/483,449, filed as application No. PCT/CA02/01072 on Jul. 12, 2002, now Pat. No. 7,526,572.

(60) Provisional application No. 60/340,839, filed on Dec. 19, 2001, provisional application No. 60/330,604, filed on Oct. 25, 2001, provisional application No. 60/327,752, filed on Oct. 9, 2001, provisional application No. 60/305,044, filed on Jul. 12, 2001.

(51) Int. Cl.
    *G06F 15/16* (2006.01)
(52) U.S. Cl.
    USPC ........... 709/246; 709/203; 709/219; 709/231; 709/236

(58) Field of Classification Search
    USPC ........................................................ 709/246
    See application file for complete search history.

(56) References Cited

U.S. PATENT DOCUMENTS 6,216,157 B1   4/2001   Vishwanath et al.
6,345,279 B1   2/2002   Li et al.
(Continued)

FOREIGN PATENT DOCUMENTS

EP    0 992 922    4/2000
GB    2 356 535    5/2001
(Continued)

OTHER PUBLICATIONS

Han, R., et al.: "Dynamic Adaptation in an Image Transcoding Proxy for Mobile Web Browsing," IEEE Personal Communications, IEEE Communications Society, US, vol. 5, No. 6, Dec. 1, 1998, pp. 8-17, XP000790121.

(Continued)

*Primary Examiner* — Melvin H Pollack
(74) *Attorney, Agent, or Firm* — Jones Day

(57) ABSTRACT

In one exemplary embodiment, a system for providing data access between an information source and a mobile communication device includes a transcoding system and a first network device. The transcoding system includes a plurality of transcoders, and each transcoder is operable to transcode information content from a respective first content type into a respective second content type. The first network device is in communication with the transcoding system and includes a connection handler system. The connection handler system is operable to receive connection data for a connection between the information source and the mobile communication device and to select a corresponding connection handler. The connection handler is operable to select one or more transcoders from the plurality of transcoders to transcode the information content.

20 Claims, 15 Drawing Sheets

(56) References Cited

U.S. PATENT DOCUMENTS

| | | | |
|---|---|---|---|
| 6,407,680 B1 | 6/2002 | Lai et al. | |
| 6,501,956 B1 | 12/2002 | Weeren et al. | |
| 6,647,431 B1 | 11/2003 | Utas | |
| 6,732,158 B1* | 5/2004 | Hesselink et al. | 709/208 |
| 6,823,373 B1 | 11/2004 | Pancha et al. | |
| 6,842,777 B1 | 1/2005 | Tuli | |
| 6,856,612 B1 | 2/2005 | Bjelland et al. | |
| 6,862,622 B2 | 3/2005 | Jorgensen | |
| 6,889,321 B1 | 5/2005 | Kung et al. | |
| 6,909,708 B1 | 6/2005 | Krishnaswamy et al. | |
| 6,925,595 B1 | 8/2005 | Whitledge et al. | |
| 6,941,382 B1 | 9/2005 | Tuli | |
| 6,970,935 B1 | 11/2005 | Maes | |
| 6,981,045 B1 | 12/2005 | Brooks | |
| 6,993,476 B1 | 1/2006 | Dutta et al. | |
| 7,003,584 B1* | 2/2006 | Floyd et al. | 709/246 |
| 7,010,002 B2 | 3/2006 | Chow et al. | |
| 7,013,322 B2 | 3/2006 | Lahr | |
| 7,020,685 B1* | 3/2006 | Chen et al. | 709/204 |
| 7,023,863 B1* | 4/2006 | Naudus et al. | 370/401 |
| 7,047,033 B2 | 5/2006 | Wyler | |
| 7,068,641 B1 | 6/2006 | Allan et al. | |
| 7,072,984 B1 | 7/2006 | Polonsky et al. | |
| 7,117,361 B1* | 10/2006 | Hild et al. | 713/161 |
| 7,120,702 B2 | 10/2006 | Huang et al. | |
| 7,134,073 B1 | 11/2006 | Fiedorowicz et al. | |
| 7,143,347 B2* | 11/2006 | Su | 715/208 |
| 7,145,898 B1 | 12/2006 | Elliott | |
| 7,149,772 B1 | 12/2006 | Kalavade | |
| 7,149,793 B2* | 12/2006 | Eriksson et al. | 709/220 |
| 7,181,441 B2 | 2/2007 | Mandato et al. | |
| 7,187,671 B2 | 3/2007 | Moyano et al. | |
| 7,194,757 B1 | 3/2007 | Fish et al. | |
| 7,197,531 B2 | 3/2007 | Anderson | |
| 7,197,535 B2* | 3/2007 | Salesky et al. | 709/204 |
| 7,225,238 B1 | 5/2007 | Dantu et al. | |
| 7,254,621 B2* | 8/2007 | Singhal et al. | 709/218 |
| 7,305,550 B2 | 12/2007 | Oliver et al. | |
| 7,409,094 B2* | 8/2008 | Wee et al. | 382/232 |
| 7,444,418 B2* | 10/2008 | Chou et al. | 709/231 |
| 7,467,187 B2* | 12/2008 | Hesselink et al. | 709/205 |
| 7,516,243 B2* | 4/2009 | Wee et al. | 709/246 |
| 7,526,572 B2* | 4/2009 | Omar et al. | 709/246 |
| 7,558,573 B2* | 7/2009 | Stuempert et al. | 455/439 |
| 7,596,593 B2* | 9/2009 | Mitchell et al. | 709/203 |
| 7,688,745 B1* | 3/2010 | Hurtta et al. | 370/252 |
| 7,743,089 B2* | 6/2010 | Putzolu | 709/202 |
| 7,779,097 B2* | 8/2010 | Lamkin et al. | 709/223 |
| 7,830,969 B2* | 11/2010 | Wee et al. | 375/240.29 |
| 7,836,474 B2* | 11/2010 | Son et al. | 725/87 |
| 7,864,186 B2* | 1/2011 | Robotham et al. | 345/581 |
| 7,877,463 B2* | 1/2011 | Lentini et al. | 709/219 |
| 7,934,002 B2* | 4/2011 | Salesky et al. | 709/228 |
| 7,934,251 B2* | 4/2011 | Hesselink et al. | 726/11 |
| 7,961,743 B2* | 6/2011 | Alao et al. | 370/401 |
| 7,987,003 B2* | 7/2011 | Hoffberg et al. | 700/17 |
| 8,004,971 B1* | 8/2011 | Szabo et al. | 370/230 |
| 2001/0016817 A1 | 8/2001 | Dejaco | |
| 2001/0054087 A1 | 12/2001 | Flom et al. | |
| 2002/0010746 A1 | 1/2002 | Jilk et al. | |
| 2002/0078092 A1 | 6/2002 | Kim | |
| 2002/0103933 A1 | 8/2002 | Garon et al. | |
| 2002/0107985 A1 | 8/2002 | Hwang et al. | |
| 2002/0133569 A1 | 9/2002 | Huang et al. | |
| 2002/0165926 A1 | 11/2002 | Rensin et al. | |
| 2002/0169823 A1 | 11/2002 | Coulombe et al. | |
| 2002/0174147 A1 | 11/2002 | Wang et al. | |
| 2002/0198964 A1 | 12/2002 | Fukazawa et al. | |
| 2003/0014531 A1 | 1/2003 | Bodin et al. | |
| 2006/0200259 A1* | 9/2006 | Hoffberg et al. | 700/86 |
| 2008/0222304 A1* | 9/2008 | Sibal et al. | 709/238 |
| 2008/0231480 A1* | 9/2008 | Lai et al. | 341/51 |
| 2009/0300205 A1* | 12/2009 | Jabri | 709/231 |
| 2010/0153495 A1* | 6/2010 | Barger et al. | 709/203 |
| 2011/0140937 A1* | 6/2011 | Lai et al. | 341/51 |

FOREIGN PATENT DOCUMENTS

| | | |
|---|---|---|
| WO | 98/43177 | 10/1998 |
| WO | 00/41359 | 7/2000 |

OTHER PUBLICATIONS

Rao, Chung-Hwa Herman, et al. "iMobile: A Proxy-Based Platform for Mobile Services," Proceedings of the 1st Workshop on Wireless Mobile Internet, 2001, pp. 3-10.

Chandra, Surendar et al. "Multimedia Web Services for Mobile Clients Using Quality Aware Transcoding," Proceedings of the 2nd ACM Intl. Workshop on Wireless Mobile Multimedia, 1999, pp. 99-108.

Bharadvaj, Harini et al. "An Active Transcoding Proxy to Support Mobile Web Access," Proceedings on the 17th IEEE Symposium on Reliable Distributed Systems, Oct. 23, 1998, pp. 118-123.

Klyne, G. "Protocol-Independent Content Negotiation Framework," RFC 2703, Sep. 1999, pp. 1-20.

Greene, N. et al. "Media Gateway Control Protocol Architecture and Requirements," RFC 2805, Apr. 2000, pp. 1-45.

Mitzel, D. "Overview of 2000 IAB Wireless Internetworking Workshop," RFC 3002, Dec. 2000, pp. 1-42.

Agarwal, A. et al. "Dacom 450/500 Facsimile Data Transcoding," RFC 803, Nov. 1981, pp. 1-14.

Mogul, J.C., "Server-Directed Transcoding," Computer Communications, Elsevier Science B.V., Amsterdam, NL, vol. 24, No. 2, Feb. 1, 2001, pp. 155-162.

Klyne, Graham, "CC/PP Attribute Vocabularies," W3C Working Draft, Jul. 21, 2000, pp. 1-34.

Fielding, et al.: "RFC 2616 HTTP/1.1" Request for Comments, Jun. 1999, Standards Track, pp. 62-92, XP002218350.

CIPO: Requisition (office action) dated Aug. 16, 2011 in Canadian Application No. 2,454,222 (2 pages).

CIPO: Requisition by the Examiner (office action) for Application 2,640,571 dated Jul. 12, 2012 (3 pages).

EPO: Communication pursuant to Article 94(3) EPC for Application 02 752 900.7-1525 dated Mar. 12, 2012 (7 pages).

EPO: Communication pursuant to Article 94(3) EPC for Application 07 014 546.1-1525 dated Mar. 13, 2012 (7 pages).

Fielding et al: Hypertext Transfer Protocol—HTTP/1.1, Jun. 1, 1999 (177 pages), XP015008399.

Kent et al: Security Architecture for the Internet Protocol, Nov. 1, 1998 (67 pages), XP 015008185.

Tanenbaum: Computer Networks, Dec. 31, 1996 (pp. 410-412), XP863987.

\* cited by examiner

SYSTEM AND METHOD FOR PROVIDING REMOTE DATA ACCESS FOR A MOBILE COMMUNICATION DEVICE

This application claims priority from U.S. patent application Ser. No. 10/483,449 filed on Jan. 8, 2004, which is a 35 U.S.C. 371 filing of PCT/CA02/01072 filed on Jul. 12, 2002, and which claims priority from the following U.S. Provisional Application Ser. No. 60/305,044, entitled "System And Method For Providing Remote Data Access For A Mobile Communication Device" and filed on Jul. 12, 2001; Ser. No. 60/327,752, entitled "System and Method For Providing Remote Data Access To A Mobile Communication Device" and filed Oct. 9, 2001; Ser. No. 60/330,604, entitled "System And Method For Providing Remote Data Access And Transcoding For A Mobile Communication Device" and filed Oct. 25, 2001; and Ser. No. 60/340,839, entitled "System And Method For Pushing Data From An Information Source To A Mobile Communication Device" and filed Dec. 19, 2001. The complete disclosures of all of the above-identified PCT, non-provisional and provisional applications are hereby incorporated into this application by reference.

CROSS REFERENCE TO RELATED APPLICATIONS

This application is also related to the following co-pending Non-Provisional application Ser. No. 10/483,457 entitled "System And Method For Providing Remote Data Access And Transcoding For A Mobile Communication Device" and filed on Jan. 8, 2004, which is a 35 U.S.C. 371 filing of PCT/CA02/01073 filed on Jul. 12, 2002; and Ser. No. 10/483,116 entitled "System And Method For Pushing Data From An Information Source To A Mobile Communication Device" and filed on Jan. 7, 2004, which is a 35 U.S.C. 371 filing of PCT/CA02/01074 filed on Jul. 12, 2002, the complete disclosures of which are hereby incorporated into this application by reference.

BACKGROUND

1. Field of the Invention

This invention relates generally to mobile communications, and in particular to providing access to remote data from mobile communication devices.

2. Description of the State of the Art

Known solutions for providing remote access to data using mobile communication devices tend to be relatively limited. For example, Wireless Application Protocol (WAP) browsers for mobile devices typically provide access only to information associated with WAP-compliant sources. Although other known and similar products may allow a mobile device user to access further information sources, such products generally do not make efficient use of mobile communication network resources, particularly wireless communication links, and often require processor-intensive operations such as information parsing to be executed on the device.

Furthermore, most known data access systems and methods are not suited to provide truly secure access to confidential information stored on private networks, such as corporate information located on a data store behind a security firewall.

SUMMARY

The instant application describes a system and method for providing mobile communication devices with access to remote information sources.

The systems and methods described herein provide for access to any of a plurality of types and formats of information. Information translation operations may be performed on an information source side of a mobile communication system in order to reduce the complexity of device processing operations and any device hardware and software components associated with such operations.

In one exemplary embodiment, a system for providing data access between an information source and a mobile communication device includes a transcoding system and a first network device. The transcoding system includes a plurality of transcoders, and each transcoder is operable to transcode information content from a respective first content type into a respective second content type. The first network device is in communication with the transcoding system and includes a connection handler system. The connection handler system is operable to receive connection data for a connection between the information source and the mobile communication device and to select a corresponding connection handler. The connection handler is operable to select one or more transcoders from the plurality of transcoders to transcode the information content.

DETAILED DESCRIPTION

General System Description

Figure 1:
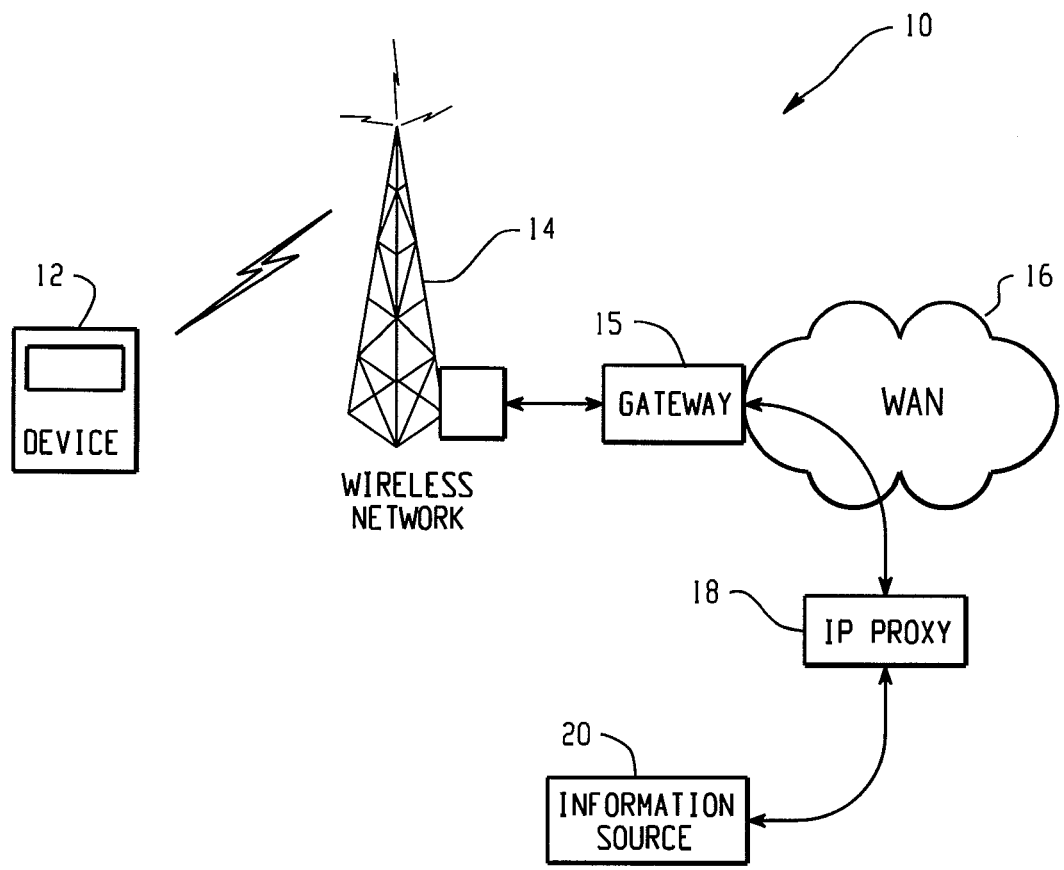
FIG. 1 is a general block diagram of a communication system that provides access to a remote information source from a mobile communication device.

FIG. 1 is a general block diagram of a communication system 10 that provides access to a remote information source 20 from a wireless mobile communication device ("mobile device") 12. In FIG. 1, the system 10 includes a mobile device 12, a wireless network 14, a gateway 15, a wide area network (WAN) 16, an Internet Protocol (IP) Proxy system 18, and an information source 20. Although an IP Proxy system 18 is shown in the illustrative example system of FIG. 1, proxy systems for protocols other than IP may be implemented in accordance with the systems and methods described herein. Protocols at other levels within the Open Systems Interconnection (OSI) model can also be proxied using these systems and methods. Such other protocols include, but are not limited to, Hypertext Transfer Protocol (HTTP) and Transmission Control Protocol (TCP).

The mobile device 12 may be any mobile device adapted to operate within a wireless communication network 14, and is preferably a two-way communication device. The mobile device 12 may have voice and data communication capabilities. Depending on the functionality provided by the mobile device 12, the mobile device 12 may be referred to as a data messaging device, a two-way pager, a cellular telephone with data messaging capabilities, a wireless Internet appliance or a data communication device (with or without telephony capabilities). As will be apparent to those skilled in the field of communications, the particular design of a communication subsystem within the mobile device 12 will be dependent upon the communication network 14 in which the mobile device 12 is intended to operate. For example, a mobile device 12 destined for a North American market may include a communication subsystem designed to operate within the Mobitex™ mobile communication system or DataTAC™ mobile communication system, whereas a mobile device 12 intended for use in Europe may incorporate a General Packet Radio Service (GPRS) communication subsystem. Those skilled in the art will also appreciate that other types of mobile devices and networks are also contemplated. The systems and methods described herein may be implemented in conjunction with virtually any wireless network 14.

The gateway 15 shown in FIG. 1 provides an interface between the wireless network 14 and a WAN 16, which may for example be the Internet. Such functions as device addressing, conversion of data between WAN protocols and wireless network protocols, storing and forwarding data to and from the mobile device 12, and other interface functions may be performed by the gateway 15.

It is also possible that an IP Proxy could be hosted by a network carrier/operator associated with the wireless network 14. In this case the connection between the IP Proxy 18 and the gateway 15 would use a private network of the carrier instead of the WAN 16. The WAN would then be used to communicate between the IP Proxy 18 and the information source 20.

The IP Proxy 18 is a system that effectively provides the mobile device 12 with access to the information source 20 and is described in further detail below. Through the IP Proxy 18, the mobile device 12 may access any information source 20, such as an Internet or web server, that can communicate with the IP Proxy 18. The information source 20 therefore requires no special applications or protocol support for wireless network communications, since it communicates with the IP Proxy 18 and not directly with the mobile device 12. Although shown in FIG. 1 as a direct connection, the IP Proxy 18 and information source 20 may also communicate through a network such as a local area network (LAN) or WAN, including the Internet.

Wireless networks and the Internet use similar addressing schemes, in which recipients, such as mobile devices in a wireless network or Internet-connected computers, are identified by numerical addresses. For example, mobile devices are identified in the Mobitex network using Mobitex Access Number (MAN) and public Internet nodes are identified using an IP address scheme. However, differences between wireless network and Internet transport mechanisms prevent direct communication between information sources 20, the vast majority of which are Internet-based, and mobile devices 12. Furthermore, information source content is largely targeted to desktop or other computer systems with relatively powerful processors and may require that processor-intensive operations such as information parsing be performed by a recipient. Since mobile devices tend to have less powerful processors, these operations take more time on such devices than on computer systems and can consume significant amounts of power from normally limited-power sources. The IP Proxy system 18 bridges the gap between Internet-based and possibly other information sources 20 and a wireless network 14 with associated mobile devices 12. The services supported by the IP Proxy 18 may include address mapping, content transformation and verification, and protocol mapping and optimisation, for example.

Detailed Description of the IP Proxy

Figure 2:
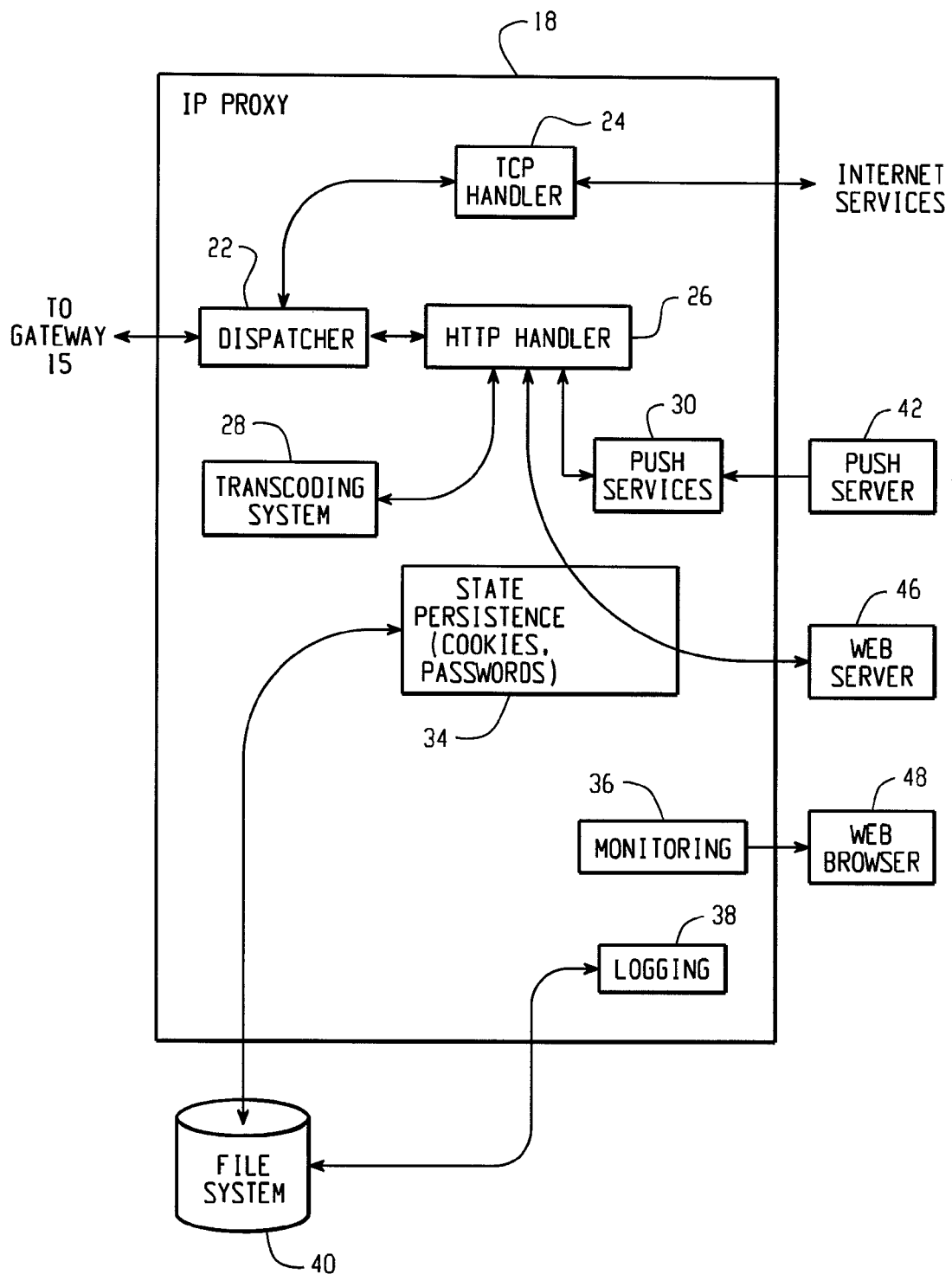
FIG. 2 is a more detailed block diagram of the system shown in FIG. 1.

FIG. 2 is a more detailed block diagram of the IP Proxy 18 shown in FIG. 1. The IP Proxy 18 may include a dispatcher 22, a TCP handler 24, an HTTP handler 26, a transcoding system 28, one or more push services generally designated 30, a state persistence element 34, a monitoring system 36, and a logging system 38. FIG. 2 also shows a push server 42, a web server 46, a web browser 48, and a file system 40, with which the IP Proxy 18 may interact from time to time. Many of the components shown in FIG. 2 may be implemented primarily as computer software modules. Elements within the IP Proxy 18 will typically be running on the same computer, whereas components external to the IP Proxy 18 are normally resident on separate computers. In an alternative embodiment, the elements of an IP Proxy may instead be distributed among a group of computers distributed over a network.

Dispatcher 22 manages data flows and the connection to the gateway 15. Depending on the type of connection or the type of data being transferred or data transaction being performed, for example, the dispatcher 22 interacts with the TCP handler 24 or the HTTP handler 26. The transcoding system 28 comprises one or more data filters, each of which converts data or other information from one format into a format that can be processed by a mobile device 12.

Push services 30 provide for transfer of "unsolicited" information from an information source such as push server 42, which may, for example, be a web server or a software application, to a mobile device 12 through the IP Proxy 18. The push services component 30 allows the push server 42 to address the mobile device 12 using, for example, the email address of the mobile device owner or some other convenient label. Accordingly, the push server 42 need not know the address of the mobile device 12 in the wireless network 14.

The state persistence element 34, in conjunction with a data file system 40 or a database, enables management of cookies, passwords and possibly other state information associated with web servers 46 to which the IP Proxy 18 may connect. It preferably stores state information about a connection that persists between discrete network packets, such as an HTTP request/response pair. The monitoring system 36 allows remote monitoring of the performance, efficiency, usage and health of an IP Proxy 18 by an administrator through an interface such as a web browser 48. As its name implies, the logging system 38 may be configured to store usage, connection, user statistics and the like to the file system 40 or some other secondary storage.

Connections and Handlers

The IP Proxy 18 can preferably handle and process content from various information sources 20, including Internet-based sources. This functionality is provided by connection handlers, which are intermediate objects that have the ability to process content from inbound and outbound connections to an IP Proxy system 18. In the IP Proxy 18 shown in FIG. 2, two such handlers, the TCP handler 24 and the HTTP handler 26, are shown. These handlers can preferably be replaced and customized or additional handlers can preferably be added to an IP Proxy 18 as needed. The connection handlers can optimise not just the content but also the protocol. For example, some requests that would normally be sent to the mobile device 12 (such as a request for a password) may be resolved by the connection handler, where requested data has been stored in the file system 40 or another store accessible to the connection handler, through the state persistence element 34, for example. This instance of a protocol optimisation can adapt so-called "chatty" protocols to be more wireless friendly by reducing the amount of traffic sent over a wireless network to a mobile device, thereby reducing the effects of wireless network bandwidth constraints and latency.

Outbound connections are made from mobile devices 12 in order to send data to and receive data from other entities such as Internet nodes. The IP Proxy 18 preferably receives connection requests from mobile devices 12 using a particular protocol, such as a proprietary protocol called IP Proxy Protocol or IPPP developed by the assignee of the present application. Other protocols may also be used. The IP Proxy 18 then establishes an Internet connection, according to protocol and routing information provided by the mobile device 12 in the connection request, and translates and maps that connection to start forwarding data in both directions. A data filtering or transcoding process is invoked whenever necessary, based on the type of content being passed over the connection, for example. Such outbound connections will be described in further detail below, in the context of web browsing operations.

Inbound connections can be used, for example, to implement a data push model. In this model, a mobile device 12 may be sent information without having issued requests to fetch the information, as is the case with outbound connections. As described briefly above, mobile devices 12 may exist on a different network domain than Internet nodes. The IP Proxy 18 is responsible for bridging the Internet and wireless network domains. Thus, the IP Proxy 18 requires certain routing information to route the traffic to a particular mobile device 12. In a push operation, at least some of this routing information must be provided by the Internet node, such as the push server 42, that issues the request to establish an inbound connection. The IP Proxy 18 may convert commonly known addressing schemes such as email or IP numbers into the appropriate wireless network address of an intended recipient mobile device 12.

Connection handlers in an IP Proxy system 18 are stream-based objects. When an outbound or inbound connection is requested, a virtual piped stream is established between mobile device 12 and the appropriate connection handler. The connection handler will be instantiated and started to process the content for the established connection. Loading of the connection handler is based on a connection request, which preferably contains a reference to appropriate handler name that implies the type of the traffic that would normally go through the virtual piped stream and the location of the handler that must be loaded if is not already loaded. The functions of connection handlers include mapping Internet or other information source-side connections and mobile device-side connections, forwarding traffic between these connections, and loading and invoking the appropriate transcoders on information destined for a mobile device.

Every connection is preferably associated with an instance of a connection handler. This is true even for a connection that does not require that content be processed by the IP Proxy 18, such as a pure TCP connection between a mobile device and a server. This type of connection handler forwards content back and forth without making any sort of modification to the content, although it may make modifications to the protocol. For clarity, those skilled in the art will appreciate the distinction between the data or content (what the mobile device requested or is being sent) and the protocol (the "wrappers" and conversions required to deliver the data).

Connection handlers are also responsible for loading the appropriate content filters or transcoders. In the above example, if the web server 46 returns Hypertext Markup Language (HTML) content for example, the HTTP connection handler 26 would then use an HTML transcoder in the transcoder system 28 if the mobile device cannot accept HTML content.

Figures 3, 4:
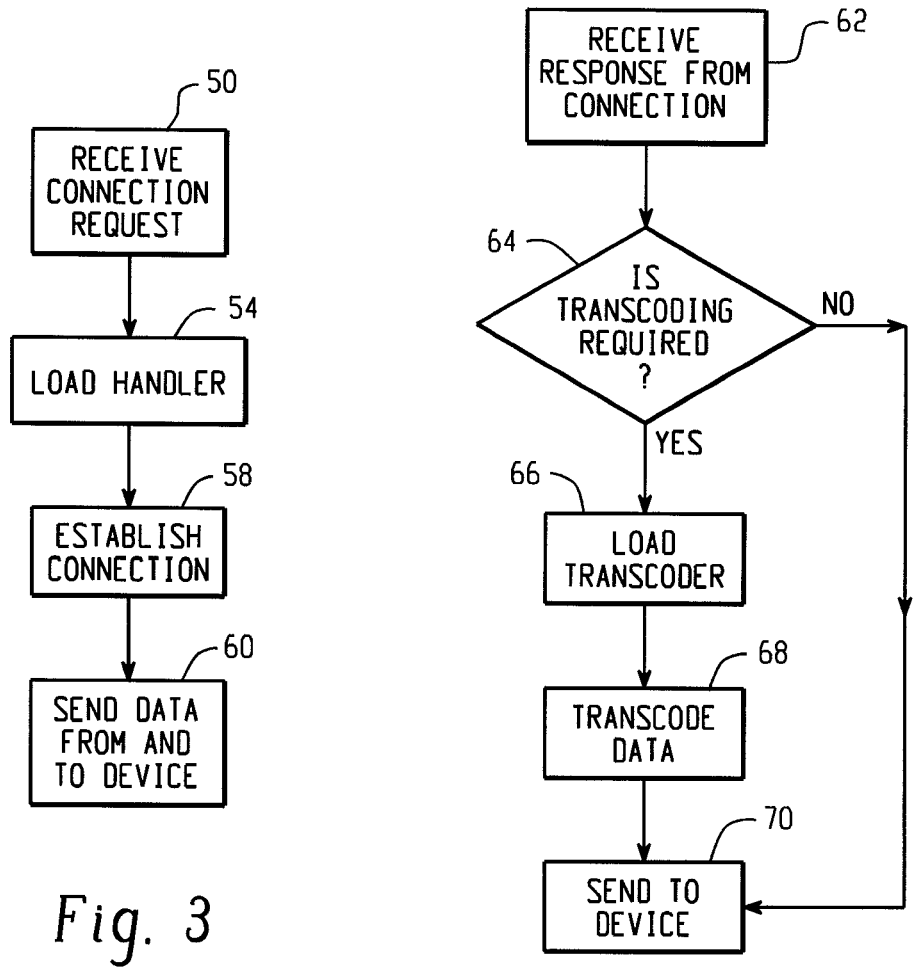
FIG. 3 is a flow chart representing general connection handler-related operations in the system.
FIG. 4 is a flow chart of connection handler data processing operations.

FIG. 3 is a flow chart representing general connection handler-related operations in an IP Proxy system 18. At step 50, the IP Proxy system 18 receives a connection request, which as described above may relate to an inbound connection or an outbound connection. When the connection is associated with a particular handler, such as an HTTP connection that requires HTTP connection handler 26, the appropriate handler is loaded and executed at step 54 and the connection is established, as indicated at step 58. If the request is outbound (from the mobile device 12), then the dispatcher 22 examines the protocol type associated with the connection request and delegates the connection to the appropriate handler. Data may then be exchanged between a mobile device 12 and an Internet service, push server 42, web server 46 or other information source 20.

If certain connection handlers, such as for a pure TCP connection as described above, are used for a connection, then the data may pass through the IP Proxy system 18 unchanged. In some IP Proxy systems however, content sent over a TCP handler may be modified. When other connection handlers are used however, data destined for a mobile device 12 may need to be converted into a suitable, final content.

FIG. 4 is a flow chart of connection handler data processing operations. At step 62, data destined for a mobile device 12 is received. Although labelled as a response from a connection, following an information request from a mobile device 12, for example, it will be understood that data received by the connection handler may instead be information to be pushed to the mobile device 12 from a push server such as 42 via push service 30. Based on the type of data received at step 62, the connection handler determines at step 64 if transcoding is required. If not, then the information is sent to the mobile device 12 at step 70. Otherwise, the appropriate transcoder is loaded and executed in step 66. The data is transcoded into an acceptable format in step 68 before being sent to the mobile device 12, as described in more detail below. The entity that initiates the communication, the mobile device 12 for fetched data or the push server for pushed data, can preferably instead request a specific transcoder to do the transcoding of the fetched or pushed data.

A connection handler may be implemented in computer software as a Java™ class file, placed in a certain directory in a file system such that an IP Proxy Java Virtual Machine (VM) may locate and load the file when needed or requested. As those skilled in the art will appreciate, Java uses CLASS-PATH environment variable as a guide to where it should perform a lookup for user defined classes. In one embodiment, paths to connection handlers are to be among the first listed paths in the CLASSPATH so that they would be loaded relatively quickly when requested. The connection direction (inbound or outbound) and the name associated with a connection handler may also play a role in defining the full class name of a handler. Those skilled in the art will appreciate that the same scheme could be implemented using dynamic linked libraries (DLLs) or dynamic shared objects (DSOs) depending on the target operating system.

Connection handlers can be associated with a name that represents a protocol at the application layer. For example, if a mobile device 12 is enabled with a web browser and may therefore request to open connection to an Internet server such as 46, it would be appropriate to have HTTP as a name for that connection handler, as shown with connection handler 26. The handler name may adhere to the known rules of naming packages in Java language. The handler name is in lower case; however, from an IP Proxy point of view, it does not matter as long as the Java VM can load that connection handler. Any Connection Handler may also have its class name as Handler.class. An example of a valid full class name that represents a connection handler is as follows:
net.rim.protocol.iplayer.connection.handler.<connectiondirection>.<connection handler name>.Handler.class
where connection direction can be either device, which implies outbound connection, or server, which implies inbound connection. Connection handler name is the name associated with the handler, for instance, http, ftp, etc.

There are at least two ways that an information source such as an Internet node can establish a connection to a mobile device 12 through the example IP Proxy system 18 shown in FIG. 2: (1) using a transportation layer protocol directly, such as TCP, to open a direct connection to the IP Proxy 18, or (2) using a datagram protocol at the application layer, such as HTTP. The IP Proxy system 18 includes two corresponding connection handlers, which may for example represent a basic IP Proxy system 18 which can process two of the most common types of connection. The first is the TCP connection handler 24, associated with the name tcp, for example. The second is the HTTP connection handler 26, which may similarly be associated with the name http, as described above. In addition to supporting common connection types, these connection handlers also satisfy requirements for Mobile Information Device Profile (MIDP) implementation at the mobile device 12. However, the IP Proxy 18 and the mobile device 12 can be extended to support any other types of connections. In the IP Proxy 18, connection handlers may possibly be added by providing an application programming interface (API) in the IP Proxy system 18 and developing new connection handlers that adhere to the API for example.

In one embodiment, connection handlers in the IP Proxy 18 are loaded from a local storage medium, for example a disk drive associated with a computer on which IP Proxy software is running. In another embodiment, connection handler storage may also or instead be remote from the IP Proxy system 18, such as in a storage medium accessible by the IP Proxy 18 through a local area network (LAN) connection or even a WAN like the Internet. This embodiment allows sharing of a single directory of connection handlers among all IP Proxy systems 18 that can communicate with the connection handler store. It is also be possible to have third parties extend the connection handler set by embedding the URL where the connection handler java class can be found.

If connected to the Internet, a connection handler directory could potentially be accessed and thus shared by all Internet-connected IP Proxy systems 18. Public Internet-connected connection handler directories would preferably receive connection handler requests from IP Proxy systems and in response transmit any requested connection handlers to the requesting IP Proxy system 18. A new connection handler may be required by an IP Proxy system 18 when a mobile device 12 which communicates with the IP Proxy system 18 downloads a new application or invokes a new mobile device feature which uses a new connection scheme or a connection method that was not previously used by the mobile device 12. A mobile device user or the new application or feature may then send a control message to the IP Proxy system 18, indicating for example the name of the required connection handler, perhaps the mobile device application that requires the new connection handler and an address associated with a connection handler directory from which the new connection handler may be requested. The IP Proxy 18 would then preferably request the new connection handler from the directory. A connection handler directory could be implemented for example as a web server accessible to an IP Proxy system 18 using HTTP requests.

When a connection handler is loaded from a remote source, the IP Proxy 18 preferably stores the handler in a local store in order to provide for faster loading of the handler for subsequent operations involving the corresponding type of connection for either the mobile device 12 for which the connection handler was initially loaded from the directory or a different mobile device 12 supported by the IP Proxy system 18. Depending upon the memory resources available to an IP Proxy system 18, downloaded connection handlers may be stored indefinitely or for a particular period of time. Alternatively, a least recently used or LRU replacement scheme could be used to provide for more efficient use of available memory by overwriting relatively less frequently used connection handlers when new handlers are downloaded. Other memory management techniques could also be used to optimize local IP Proxy connection handler storage arrangements.

Transcoding

Relative to computer networks such as the Internet, wireless communication networks are slow. Any system that bridges the two, as the IP Proxy does, may have to transform Internet data so that it is formatted appropriately for a wireless network and mobile device. This process is referred to herein as filtering or transcoding, and usually involves such operations as compressing data from the Internet into a more compact format appropriate for wireless transmission.

In the following description, transcoding operations are illustrated primarily in the context of the above example of an HTTP handler 26 and HTTP connection. The HTTP connection and handler example is particularly useful in that HTTP allows content tags in the form of Multipurpose Internet Mail Extension (MIME) types, which may be used to determine the appropriate transcoder for received information.

In accordance with the IP Proxy system 18 disclosed herein, there is a single configuration file for each type of connection handler. In the IP Proxy 18 for example, a single configuration file is associated with the HTTP connection handler 26 and includes information for all HTTP content transcoders. This configuration file is used to map transcoders to certain content types. The IP Proxy 18 may consult this file to determine which content transcoder it should load to manipulate any received content destined for a mobile device.

In the configuration file, general rules are preferably specified for how to define the mapping between content types and transcoders. One example of a possible configuration file entry is as follows:

Entry={[default]:{$RSV$|<Transcoder name>}}|{[[InputType]|<→OutputType>]:[Transcoder name]} where default indicates to the IP Proxy which default transcoder should be loaded in case there is no one transcoder associated with a received content type;

RSV is a set of reserved keywords that is used in configuration file, such as pass (i.e. forward data to the mobile device without transcoding) or discard (i.e. do not transcode or forward data to the mobile device);

Transcoder name is the name of the mapped transcoder;

InputType indicates the input content type that the mapped transcoder accepts, which for an HTTP transcoder configuration file may be a MIME type; and OutputType indicates the output type, such as a MIME type for an HTTP transcoder, that the transcoder generates.

By using a content transcoder configuration file new transcoders may be added for use by the IP Proxy 18. Therefore, as new transcoders are developed and become available, they can be added to the configuration file for any appropriate connection handlers and can thereafter be loaded by a connection handler when required, and without affecting other components of the IP Proxy system 18. For example, configuration file entries may be added without shutting down the entire IP Proxy system 18, thus allowing dynamic expansion of data that can be converted for transmission to mobile devices 12.

In another embodiment, a common configuration file format for all connection handlers is used, and thus a only single configuration file entry need be prepared and can be added to the configuration file for any connection handler. The concept of a common configuration file format for all connection handlers can be further extended to providing a single configuration file for an IP Proxy 18. Such a configuration file could be used by all connection handlers in the IP Proxy 18 to determine which content transcoders are available and to select a particular transcoder for received content. However, it should be understood that a common configuration file format is in no way required. Some connection handlers may share a configuration file entry format or even a single configuration file, whereas others supported by the same IP Proxy 18 may have different configuration files and entry formats.

The IP Proxy 18 preferably loads a transcoder based on the available information regarding the content type of the data being either pushed to or pulled from mobile device 12. The IP Proxy 18 may use accept and content type header fields to decide which transcoder should be loaded. Several illustrative example content transcoder loading control schemes are described in further detail below. Although these examples relate primarily to HTTP connections and handlers, those skilled in the art will appreciate that other connection types and handlers may use similar arrangements and methods to select a transcoder when content is received at an IP Proxy system 18.

It should also be appreciated that a transcoder may instead be selected based upon information other than content types, including information in a header portion or other portion of a connection request from a mobile device, a response to a connection request, or a communication from an information source including information to be pushed to a mobile device. For example, an IP Proxy system 18 may be configured to determine a type of the mobile device 12 to which data is to be sent. Transcoder selection by the IP Proxy system 18 could similarly be based on a network address or other identifier of the mobile device 12. Mobile device- or device type-dependent transcoder selection schemes may be supported by providing a device or device type mapping table accessible to the IP Proxy system 18, which maps devices or device types to transcoders. Alternatively, a configuration file may be adapted to include device or device type identifiers to thereby associate particular transcoders with devices or device types.

In a similar manner, transcoders may be selected based on an address (such as a URL) or other identifier of an information source, to enable information source-specific transcoding. A mapping table or a configuration file accessible to an IP Proxy system such as 18, may be used to enable transcoder selection based on information source. This type of transcoder selection may be useful, for example, when a particular transcoder is to be used to transcode any content that originates from a specific website and is destined for a mobile device.

Although content type-based transcoder selection is the primary type of transcoder selection scheme described below, any of these alternative schemes may be used instead of content type-based transcoder selection. The alternative schemes may also be used to select a transcoder, for example, when a transcoder indicated by a primary transcoder selection scheme is not available, such as when a transcoder system does not include a transcoder configured to transcode a received content type into a content type that the mobile device is configured to accept.

An HTTP connection handler in an IP Proxy system 18 will normally attempt to load a transcoder based on Accept line and the Content-Type header fields. The IP Proxy may load a transcoder if it has information regarding the content type(s) that a mobile device 12 is configured to accept and the content type that a server or other information source 20 returns. For example, in this case the HTTP connection handler 26 in the IP Proxy 18 may use an InputType→OutputType key format to consult its configuration file when configuration file entries include content type fields, as in the above example file entry.

The HTTP connection handler 26 may also load a transcoder if it has information only about the server or source 20 content type but not what the mobile device 12 can accept. In this case the, the IP Proxy 18 can use the InputType key format to consult its configuration file. If the connection handler is unable to determine which transcoder should be used, it will preferably load a predetermined default transcoder. When the default transcoder is used, the IP Proxy 18 may send an error message to a mobile device 12 if the output content type of the default transcoder is not acceptable by the mobile device 12 or if the default is discard (see the above example configuration file entry). Since most data pull-based information sources such as web servers do not embody automatic resend or retry functions when such delivery errors occur, error messages will normally be sent only to the requesting mobile device 12. A mobile device user may then send a new request to retrieve the information. However, when the information originates at a push server 42, an error may be returned to the sending server, which may then initiate a new push operation.

Consider the case of a simple HTTP operation in which no Accept header is specified. A mobile device user or an application on the mobile device 12 issues an HTTP request indicating no Accept header field of content types that the mobile device 12 or application can accept. The IP Proxy 18 may, in the absence of Accept header information, infer that any type of content can be accepted and forward the request to the appropriate information source 20. When information content destined for the mobile device 12 in response to the request is received by the HTTP connection handler in the IP Proxy 18, the content is sent to mobile device 12 as is, regardless of content type. Since the mobile device 12 in this case can presumably accept any content type, the HTTP handler determines that no transcoding is required and therefore does not load or use any of the HTTP transcoders. Alternatively, the IP Proxy 18 may be configured to attempt to match the returned content type with one of its transcoders. In the event that an appropriate transcoder which can transcode the returned content type is found, the transcoder is loaded and used to transcode the content for transmission to the mobile device 12. Otherwise, the IP Proxy 18 may load the default transcoder or discard the received content.

Other mechanisms for coping with missing content type information in a request from the mobile device 12 will be apparent to those skilled in the art. The particular mechanism implemented in an IP Proxy system 18 may for example be a default mechanism used by the IP Proxy system 18 whenever an information request does not indicate an acceptable content type, dependent upon a setting in a mobile device user profile stored in a database accessible to the IP Proxy 18, or determined by an IP Proxy owner or operator. However, the mobile device 12 and any applications resident thereon are preferably configured to include accepted content type indicators in all information requests generated at the mobile device 12, in order to provide the IP Proxy 18 with reliable and current information regarding the type(s) of content that a mobile device 12 can accept. Pattern matching techniques may also be used to produce more complex default behaviour such as applying a transcoder to transcode all data to a common output type regardless of the input type. The order of such pattern/transcoder rules may connote priority.

As described above, there is preferably a transcoder configuration file for each connection handler supported by an IP Proxy system 18, or possibly a single configuration file shared by all connection handlers. Such a configuration file not only provides a mechanism for adding new transcoders as they become available, but also allows a connection handler to quickly determine which transcoders are available in the IP Proxy system 18 and then effectively extend the types of content that can be accepted in response to an information request.

Figure 5:
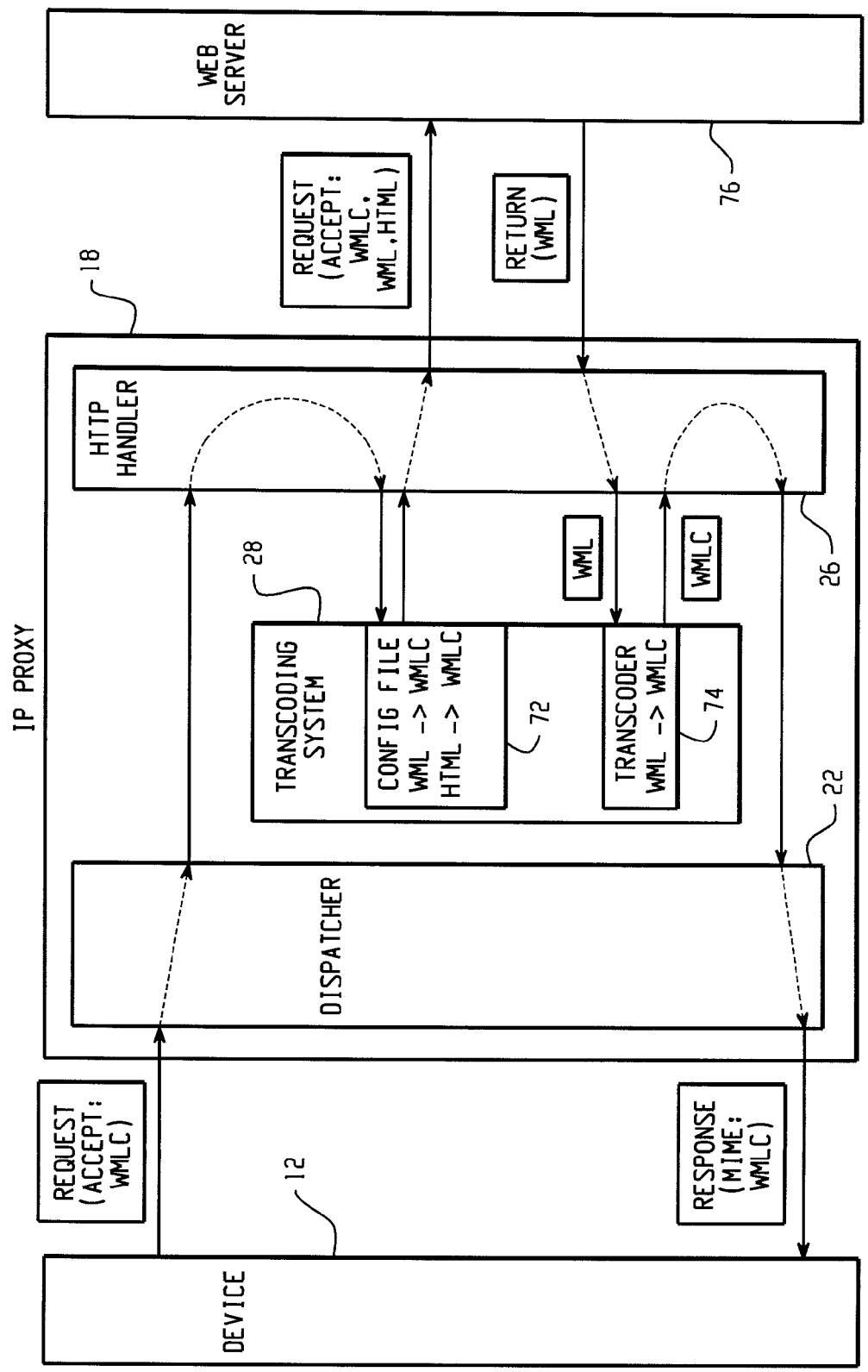
FIG. 5 is a signal flow diagram showing the extension of accepted content types by an HTTP connection handler based on available transcoders.

FIG. 5 is a signal flow diagram showing the extension of accepted content types by an HTTP connection handler based on available transcoders. Although FIG. 5 shows only those components of the IP Proxy system 18 directly involved in the example of an HTTP request from a mobile device 12, those skilled in the art will appreciate that other system components may also be present. In order to avoid congestion in the drawings however, such components as 30 through 48 in FIG. 2 have not been shown in FIG. 5.

In FIG. 5, an HTTP request is sent from the mobile device 12, through a wireless network and possibly through a WAN and appropriate gateway to the IP Proxy system 18. As described above, the mobile device 12 may communicate with an IP Proxy system 18 using a protocol other than HTTP, such as the proprietary IPPP. In such arrangements, although the connection request conforms to a particular protocol, the request may specify a connection type or connection handler, HTTP in this example, associated with a different protocol. Therefore, references to HTTP requests sent from a mobile device 12 should be interpreted to include both HTTP requests, if mobile device to IP Proxy communications are via HTTP, as well as connection requests which conform to other protocols but specify HTTP or HTTP connection handlers and thus are interpreted by an IP Proxy as HTTP requests.

The connection request is received by the dispatcher 22, which recognizes the request as an HTTP request and loads the HTTP handler 26. In its Accept line, the request in this example specifies that the mobile device 12 can accept a tokenized, compressed version of Wireless Markup Language (WML) which is generally referred to Compiled WML or simply WMLC. The HTTP handler then uses this accepted content type (WMLC) to perform a lookup in the configuration file 72, shown in the transcoding system 28 in FIG. 5. It will be appreciated by those skilled in the art however, that the configuration file 72 might instead be external to the transcoding system 28, part of the HTTP handler 26, or even external to the IP Proxy system 18 provided that the HTTP handler can access the file. In most implementations, the configuration file will be stored in a data store accessible by the IP Proxy system 18, typically on the same computer system on or in conjunction with which the IP Proxy 18 is running.

The HTTP handler 26 searches the configuration file 72 to determine which if any of its associated transcoders outputs the requested content type, WMLC. In one embodiment, a lookup table which maps input content types to output content types for all configured transcoders is constructed when transcoders are first loaded to the IP Proxy system 18. The IP Proxy system 18 then accesses the table and determines which content types it can convert into the requested content type (WMLC). In FIG. 5, the configuration file 72 or alternatively a lookup table, includes entries for two transcoders, one for converting from WML to WMLC and the other for converting from HTML to WMLC. The HTTP handler 26 then adds the extra MIME types (WML, HTML) that it can convert to the requested type (WMLC) and submits a request to the web server 76. As shown in FIG. 5, the request prepared and sent by the IP Proxy 18 to the web server 76 includes WMLC, WML and HTML in its Accept line.

The request preferably lists the accepted content types in order of preference. For example, since the mobile device 12 can accept WMLC, this type of content does not require transcoding and therefore preferably appears first in the IP Proxy request. Other content types may then be listed in order of decreasing transcoding complexity, for example, or based upon some other criteria. The order of preference of content types may also be indicated explicitly, for example using quality factors in the Accept line.

In response to an HTTP request from the IP Proxy 18, the web server 76 returns requested content, in WML format in the example in FIG. 5, to the IP Proxy 18. The HTTP handler 26 then determines that the returned content is WML, loads the appropriate WML→WMLC transcoder 74 from a local store for example, and executes the transcoder to convert the received content into WMLC. The WMLC content is then forwarded to the mobile device 12, through the dispatcher 22. When WMLC content is returned by the web server 76, the HTTP handler 26 forwards the content to the dispatcher 22 without transcoding, whereas if HTML content is returned, an HTML→WMLC transcoder would be invoked to convert the content to WMLC. Although FIG. 5 shows the response to the mobile device 12 being handled by the dispatcher 22, similar protocol translation or conversion between HTTP used by the handler 26 and a communication protocol used by the mobile device 12 may instead be performed by the HTTP handler 26 or another IP Proxy protocol translation/conversion module.

As described above, if the returned content cannot be converted to the requested type, for example if the HTTP handler 26 does not have an appropriate transcoder or cannot determine the best transcoder to use, then the default transcoder is preferably used. An error message may be returned to the mobile device 12 if the output of the default transcoder cannot be accepted by the mobile device or the default transcoder is discard.

The Accept line extension by a connection handler is in no way restricted to single-transcoder operations. In the example of FIG. 5, each transcoder converts directly from one format into the requested format. Another embodiment, a more extensive search of the configuration file 72 may be conducted or a more exhaustive lookup table may be assembled. Thus, multiple transcoders may be used to convert received content into a format or type that may be accepted by the mobile device.

Figure 6:
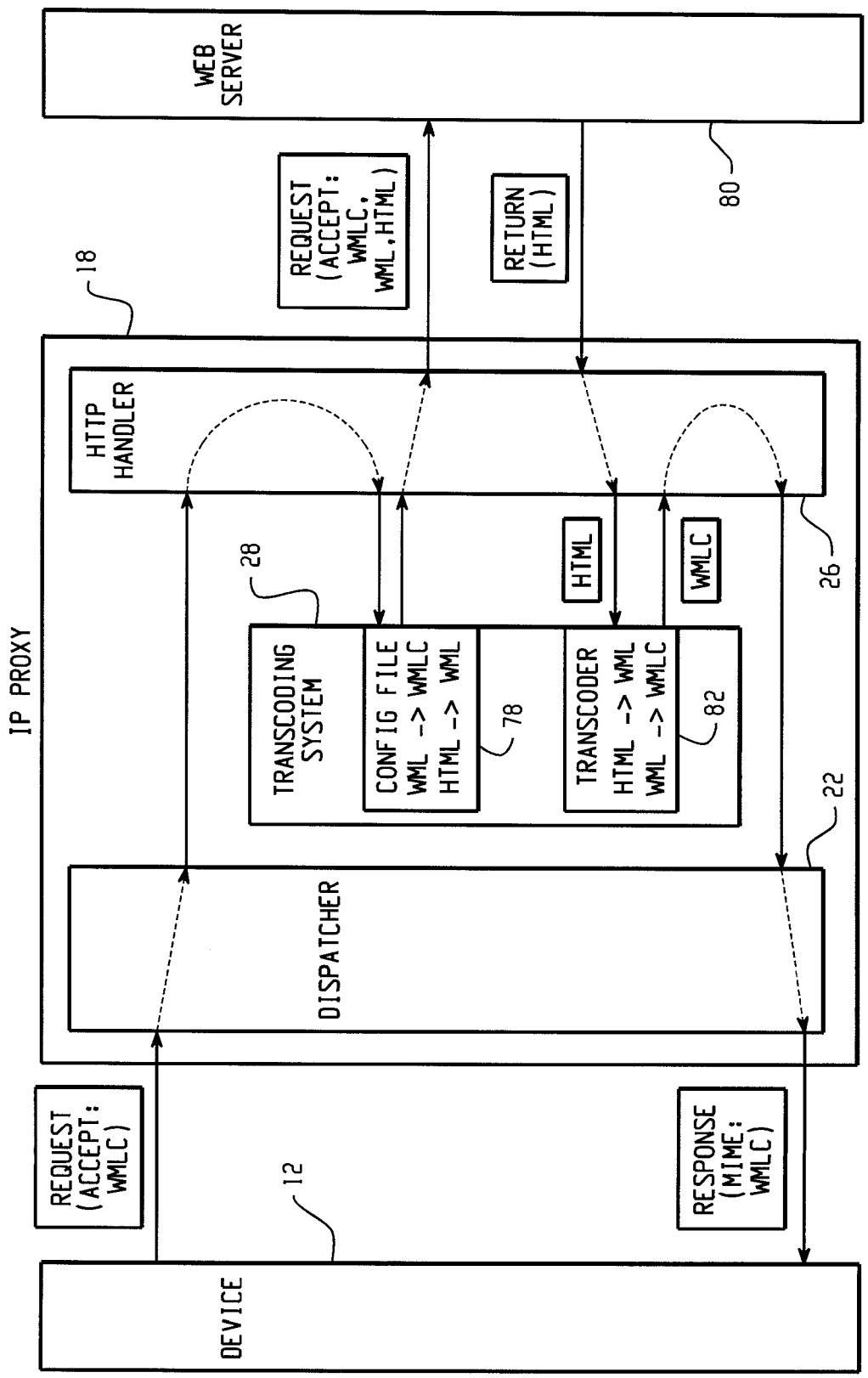
FIG. 6 is a signal flow diagram showing multiple transcoding operations for an HTTP operation.

FIG. 6 is a signal flow diagram showing multiple or "chained" transcoding operations for an HTTP operation. As in FIG. 5, FIG. 6 shows only those components of the IP Proxy system 18 directly involved in an HTTP request from a mobile device 12 in order to avoid congestion in the drawings.

An HTTP request is sent from the mobile device 12 to the IP Proxy system 18, possibly through one or more intervening networks and interface components. As in the above example, the request is received by the dispatcher 22, which recognizes the request as an HTTP request and loads the HTTP handler 26. The HTTP handler 26 then consults the configuration file 78 searching not only for transcoders that output WMLC, but also for transcoders that output content types that may be input to any transcoder that outputs WMLC. Therefore, according to this embodiment, additional MIME types are appended to the header Accept line of an HTTP request based not only on transcoder outputs, but also on transcoder inputs. In FIG. 6 for example, the HTTP handler 26, perhaps in a first search pass through the configuration file 78, finds the WML→WMLC transcoder entry. The HTTP handler 26 may then repeat the configuration file search for any transcoders such as the HTML→WML transcoder that convert content into WML, which it can convert into the requested WMLC content type, to thereby further extend the list of accepted content types. The configuration file search may be further repeated by the HTTP handler 26, depending for example on acceptable delays in HTTP request processing.

In order to avoid the delays and demand on processing resources associated with such multiple search passes through a configuration file, a transcoder content type lookup table may be used. When transcoders are first installed in an IP Proxy system 18, a comprehensive mapping table is preferably constructed to map received content types to possible output content types. For example, in FIG. 6, a lookup table entry for WMLC content would indicate that either WML or HTML can be converted into WMLC. Such a table would also preferably indicate that HTML→WMLC transcoding involves two stages of transcoding. The table might instead be organized into single- and chained-transcoding sections, whereby if only a single transcoding operation is preferred, the single-transcoder part of the table including an entry for the WML→WMLC transcoder would be accessed. Illustratively, a chained transcoder 82 that converts HTML to WMLC may be created from the HTML→WML and WML→WMLC transcoders. The HTML→WML and WML→WMLC transcoders may also be separately invoked.

If further transcoding operations and the associated processing operations and time delays are acceptable, then the HTTP handler 26 may perform a lookup of an accepted content type or possibly an input type for a previously identified transcoder in a chained-transcoder section of the table. Preferably, the format of the transcoding configuration file may be changed to represent just such a lookup table in order to speed up the search. This may be accomplished, for example, by specifying a path between content types involving multiple transcoders.

The determination of whether multiple transcoding operations will be permitted may be made by the HTTP handler 26 either before or after the table or configuration file lookup operation is performed, before an HTTP request is sent to the web server 80, or even after the requested content is received from an information source 20. In the example of FIG. 6, it should be apparent that multiple transcoders may be invoked to convert received content into WMLC. The Accept line in the header of the HTTP request from the mobile device 12 is therefore expanded to include WML and HTML in addition to WMLC. As described above, the accepted formats are preferably listed in order of preference. Since HTML requires two transcoding operations instead of the single transcoding operation required to convert from WML to WMLC, WML is preferably listed before HTML in the Accept line of the HTTP request sent from the IP Proxy 18 to the web server 80. Similarly, WMLC requires no transcoding and is preferably listed first in the Accept line.

It is also feasible for the chain of transcoders to include both local and remote transcoding services. These remote transcoding services could be transcoder files that the IP Proxy 18 discovers, downloads and executes or they could be web based transcoding services which receive data in one format and return it in another, as described in further detail below.

The web server 80 then returns the requested content, in HTML format in the example in FIG. 6, to the IP Proxy 18 in response to the HTTP request. The HTTP handler 26 determines that the returned content is HTML, loads and executes the HTML→WML transcoder and then loads and executes the WML→WMLC transcoder on the WML result of the first transcoding operation. The resultant WMLC content is then forwarded to the dispatcher 22 and then to the mobile device 12. If WMLC content is returned by the web server 80, the HTTP handler 26 forwards the content to the dispatcher 22 without transcoding, whereas if WML content is returned, the WML→WMLC transcoder is invoked.

It is contemplated that the determination as to whether multiple transcoding operations are allowed will be made dependent upon predetermined criteria such as maximum HTTP request processing time or maximum content transcoding time or processor time for example. This determination might also take a user-specified priority into account. If high time priority (low time delay) is assigned by the user to a submitted request, then single transcoder operations may be selected. Alternatively, if a high data priority is associated with a request, then any number of chained transcoder operations may be allowed in order to get the requested data back to the mobile device in an acceptable format. Other criteria which may be applied by a connection handler include but are in no way limited to allowing chained transcoders only for relatively small amounts of received content, only at certain times of day, under specific current traffic conditions, or only when the configuration file or lookup table is stored in a local file system. Further criteria will be apparent to those skilled in the art and as such remain within the scope of the present application.

In the case of a data push to a mobile device 12 from a push server such as 42 (FIG. 2), if the server pushes data content but does not specify a MIME type, then the default transcoder is preferably used. If the default transcoder outputs a content type that cannot be accepted by the mobile device 12, an error signal is preferably returned to the push server 42, which may then re-send the data to the mobile device 12. The error signal further preferably indicates to the push server 42 a reason for any such delivery failure, such that the push server 42 may attempt to remedy the delivery problem if possible before the data is re-sent. Where the data could not be delivered to the mobile device 12 because no MIME type was specified and the default transcoder could not transcode the data into an acceptable content type for example, then the push server 42 may re-send the data with an appropriate MIME type.

Processing of a server data push with a specified MIME type may depend upon whether or not the IP Proxy 18 knows the content types that a mobile device 12 can accept. Unlike the above example of an HTTP request and response process, the IP Proxy 18 does not have a request from the mobile device 12 indicating an acceptable content type when data is being pushed to the mobile device 12. If the IP Proxy 18 does not know which content type(s) that the mobile device 12 can accept, then the default transcoder is preferably used. However, in this situation, the active connection handler may instead consult the transcoder configuration file or lookup table to determine if a transcoder that accepts the returned content type as input is available. If an available transcoder is found, then it is loaded and used to transcode the received content. If more than one appropriate transcoder is found, then one of them, for example the transcoder having the first entry in the configuration file or the transcoder that was used previously, such as the transcoder that was used most recently, to transcode data for the particular mobile device 12 to which the content is destined, may be loaded and executed. A transcoder may also be selected and used on the basis of a content type that was previously sent to the mobile device 12.

External Transcoder Systems

Figure 7:
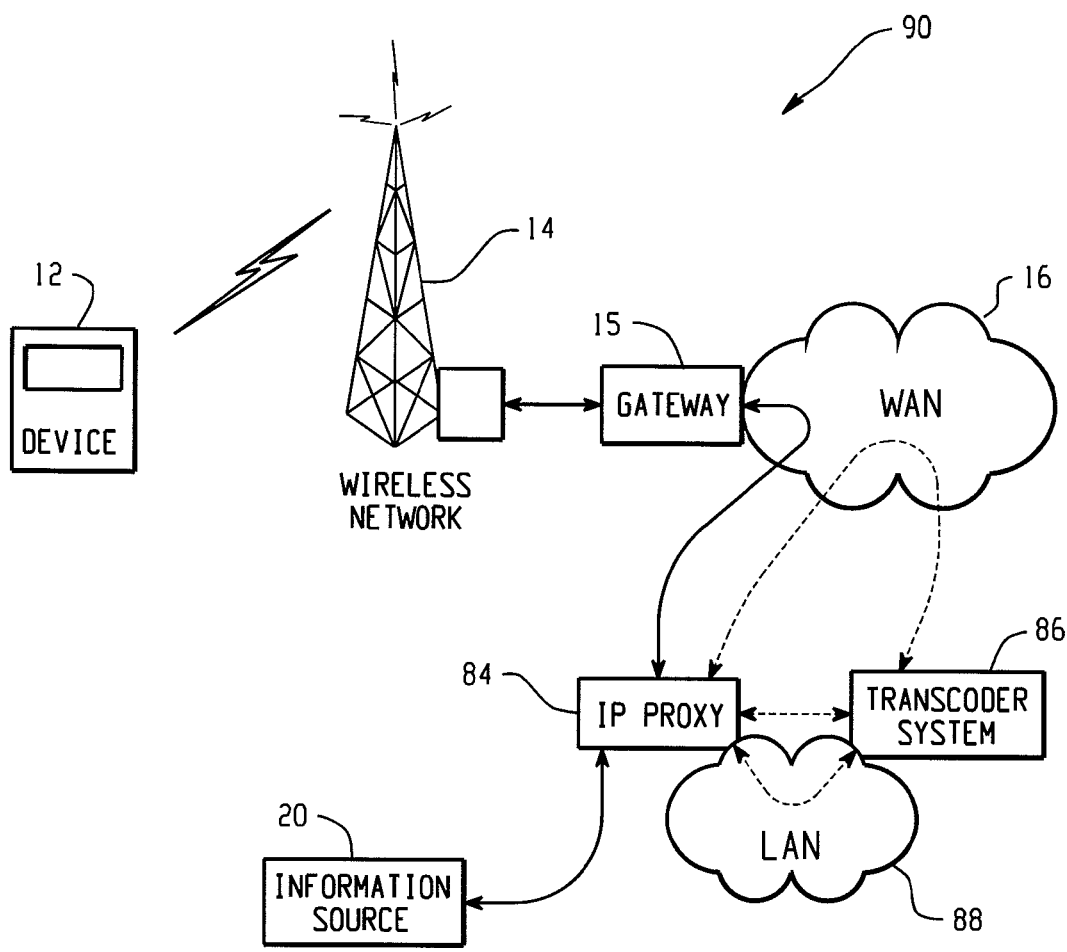
FIG. 7 is a general block diagram of a communication system with an external transcoder system.

As described briefly above, transcoders may be loaded as needed from a local store on a computer system on which an IP Proxy system 18 has been implemented. In another embodiment, transcoders may also be loaded from an external store. FIG. 7 is a general block diagram of a communication system with an external transcoder system.

The system 90 shown in FIG. 7 is similar to system 10 of FIG. 1 except for the external transcoder system 86. Elements common to both systems 10 and 90 have been described above. As shown by the dashed lines in FIG. 7, the IP Proxy system 84 may communicate with the transcoder system 86 through some sort of direct connection such as a serial port or connection, through a WAN 16 such as the Internet, or through a LAN 88 within which the IP Proxy system 84 and the transcoder system 86 are configured to operate. Other communication links between the IP Proxy 84 and the transcoder system 86 will be apparent to those skilled in the art.

Figure 8:
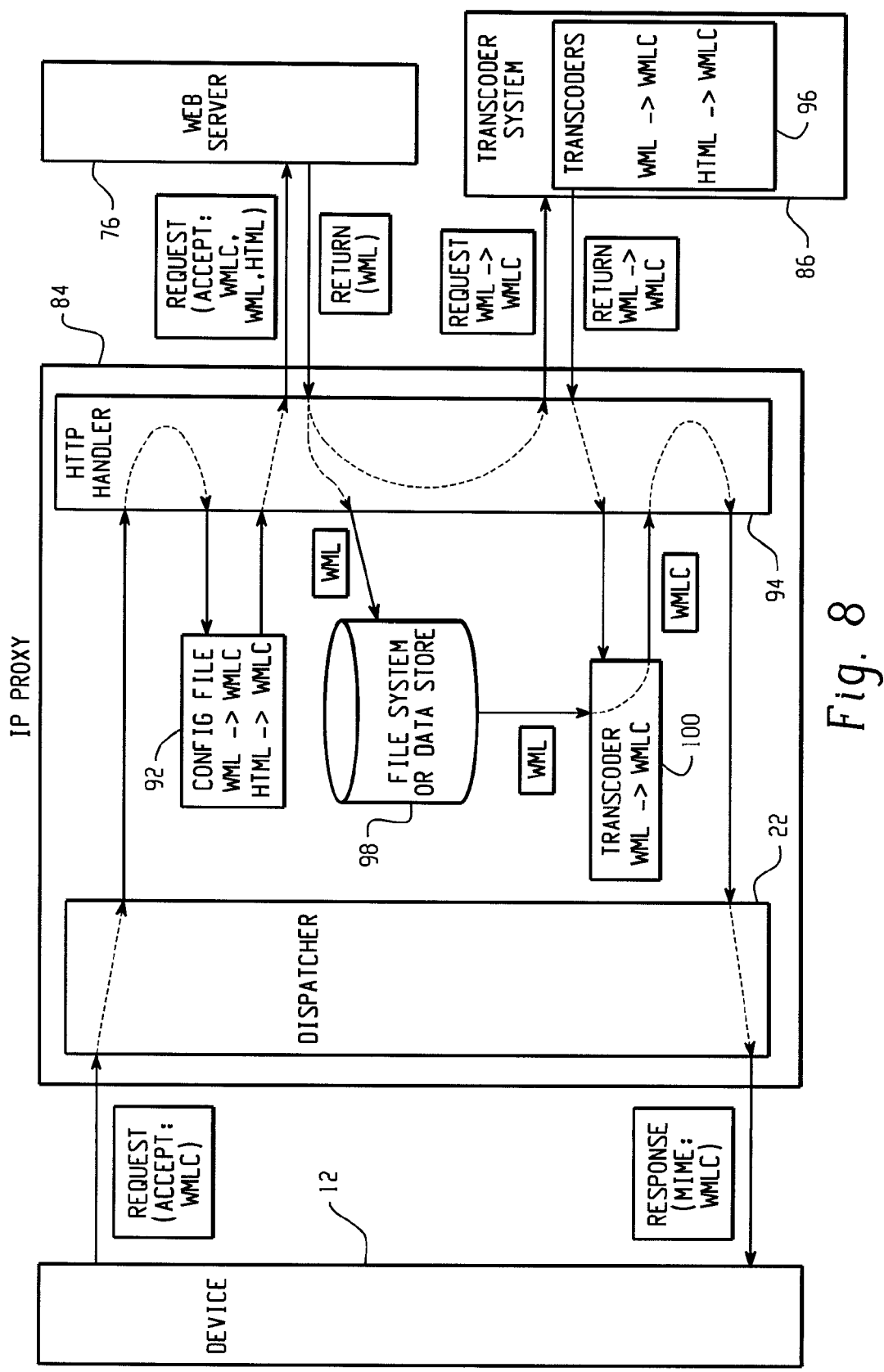
FIG. 8 is a signal flow diagram illustrating an example HTTP operation for an external transcoder system such as shown in FIG. 7.

FIG. 8 is a signal flow diagram illustrating an example HTTP operation for an external transcoder system such as shown in FIG. 7. As in the preceding examples, an HTTP request is sent from the mobile device 12 to the IP Proxy 84, indicating that WMLC content is accepted at the mobile device 12. The request is received by the dispatcher 22 in the IP Proxy system 84, which determines that the request is an HTTP request and thus forwards the request to the HTTP connection handler 94. The HTTP handler 94 may be substantially similar to the HTTP handler 26 in FIG. 2 for example, although it operates somewhat differently than handler 24 to load content transcoders. The HTTP handler 94 intercepts the HTTP request from the mobile device 12 and may then refer to a transcoder configuration file 92 or a lookup table as described above to determine whether or not any transcoders are available to convert other types of content into a type that is acceptable at the mobile device 12. If entries corresponding to one or more appropriate transcoders are found in the configuration file 92 or lookup table, then the HTTP handler 94 preferably includes any further content types in a request that is sent to an information source such as web server 76. Web server 76 processes the request from the IP Proxy system 84 and returns WML content to the HTTP handler 94. These operations are substantially as described above in the preceding examples.

When the WML content is received by the HTTP handler 94, it is preferably stored in a file system or other data store 98 while the appropriate transcoder is loaded. In the example of FIG. 8, the HTTP handler 94 requests the required WML→WMLC transcoder from the transcoder system 86. Although this request is shown in FIG. 8 as an HTTP request from the HTTP handler 94, it should be apparent that other transfer mechanisms might instead be used by an IP Proxy system 84 to retrieve a transcoder from a remote transcoder system 86. For example, if the IP Proxy system 84 communicates with the transcoder system 86 via a LAN 88 (FIG. 7), then a LAN protocol or data access and transfer scheme could be invoked by the HTTP handler 94 in order to retrieve any required transcoders. In FIG. 8, the transcoder system 86 locates the requested WML→WMLC transcoder among its available transcoders 96 and returns the requested transcoder to the IP Proxy system 84.

Regardless of the particular transcoder transfer mechanism implemented, the IP Proxy system 84, or in the example of FIG. 8 the HTTP handler 94, receives and loads the returned WML→WMLC transcoder, as indicated at 100. The previously received and possibly stored WML content may then be processed by the transcoder 100 to transcode the WML content into WMLC content acceptable by the mobile device 12, and a response containing the transcoded content is returned to the mobile device 12 by the dispatcher 22.

If chained transcoder operations are enabled, then more than one transcoder request may be made by the IP Proxy system 84 to the transcoder system 86. Multiple transcoders may instead be requested in a single request to the transcoder system 86. Processing of previously received content for chained transcoder operations may proceed either as each required transcoder is loaded by the IP Proxy system 18, with intermediate transcoded content possibly being stored in a file system or data store such as 98, or only when all required transcoders have been loaded.

When a transcoding operation is complete, a transcoder loaded from the external system 86 is preferably stored locally by the IP Proxy system 84 in order to avoid subsequent requests to the external transcoder system 86 for the same transcoder. Retrieval and loading of a transcoder from a local or internal store in the IP Proxy system 84 will typically be completed much faster than a request to a remote system and reduces traffic on the communication link between the IP Proxy system 84 and the transcoder system 86. In such IP Proxy systems, the active connection handler, which is the HTTP handler 94 in FIG. 8, preferably determines whether a required transcoder is stored in a local data store before requesting the transcoder from the external transcoder system 86. Depending upon the amount of available storage, transcoders may be stored indefinitely or for a certain predetermined period of time. Other memory management schemes, such as over-writing stored transcoders on an LRU basis for example, may also be used when memory resources are limited.

The configuration file 92 or transcoder lookup table may be adapted for external transcoder loading by including an indication of the location of a transcoder in the configuration file or table entry for the transcoder. The file 92 or table is preferably updated if a transcoder is stored to, or overwritten in a local memory, such that the active handler can determine from the initial lookup operation whether the transcoder must be loaded from the external transcoder system 86. When a transcoder has not been or is no longer stored locally, then the file 92 or lookup table preferably indicates from where the transcoder may be retrieved. For a transcoder that may be retrieved through an HTTP connection, the corresponding file or table entry may indicate the IP address of the transcoder system 86, whereas a network address may be specified in the configuration file or lookup table when a LAN connection is used.

It is also contemplated that more than one external transcoder system may be implemented in a communication system such as 90. In such an arrangement, the configuration file 92 or lookup table would preferably include entries for all transcoders that are available to an IP Proxy system 84 through all of the external transcoder systems with which it can communicate. An IP Proxy 84 may thereby download transcoders from any of a number of transcoder systems via direct or network connections. Overall operation of an IP Proxy system 84 with multiple transcoder systems would be substantially as described above, except that different transcoder systems may be accessed, possibly using different transfer mechanisms and communication protocols, for each data transcoding operation. Chained transcoding operations may also potentially involve communication with different transcoder systems.

The configuration file 92 or lookup table is preferably arranged to facilitate a simple resolution scheme when a particular type of transcoder is available from more than one transcoder system. Although an IP Proxy system 84 may be able to access multiple transcoder systems, an owner or administrator of an IP Proxy system 84 may designate one of these transcoder systems as a preferred or default system from which the IP Proxy 84 first attempts to download a transcoder. The order of preference of transcoder systems for any transcoder available from more than one transcoder system may for example be reflected in the order of configuration file or lookup table entries. If the file or table is arranged by transcoder type, then entries corresponding to the most preferred sources for a particular transcoder are preferably listed before entries associated with other transcoder systems. The configuration file or lookup table may instead be arranged according to transcoder system, with all entries for the default or preferred transcoder system occurring first. In both these example arrangements, an IP Proxy system 84 will preferably attempt to load a particular transcoder from its preferred source before accessing any other sources.

It should be apparent from the foregoing description that if a transcoder in the configuration file or lookup table could not be loaded by an IP Proxy system 84, then an error may be returned to the mobile device 12 and possibly an information source 20, particularly when the information source is attempting to push content to the mobile device 12. Failure to load a transcoder may also be resolved by finding alternative transcoders or chaining of transcoders. Another method to resolve transcoder problems is to modify the accepted line to remove the data type that caused the problem, and resubmit the request to the web server or information source 20.

As described above, new transcoders may be registered with an IP Proxy system 84 by adding a corresponding entry to the configuration file 92 or a transcoder lookup table. Therefore, when a new transcoder is added to any external transcoder system, the configuration file 92 or lookup table in each IP Proxy system 84 that may download transcoders from the transcoder system is preferably updated accordingly. This may be accomplished for example by configuring transcoder systems to send update messages to the IP Proxy systems 84 when new transcoders are added. A transcoder system may instead append an update message or indicator to responses to requests from an IP Proxy system 84 following the addition of a new transcoder. According to this scheme, an update message or indicator may be appended to the response to an IP Proxy system 84 the first time any transcoder is requested from a transcoder system after a new transcoder has been added. An IP Proxy transcoding configuration file or lookup table may also be kept current with one or more external transcoder systems by executing a discovery routine, whereby a registry of available transcoders is periodically queried to "discover" new transcoders as they become available.

Figure 9:
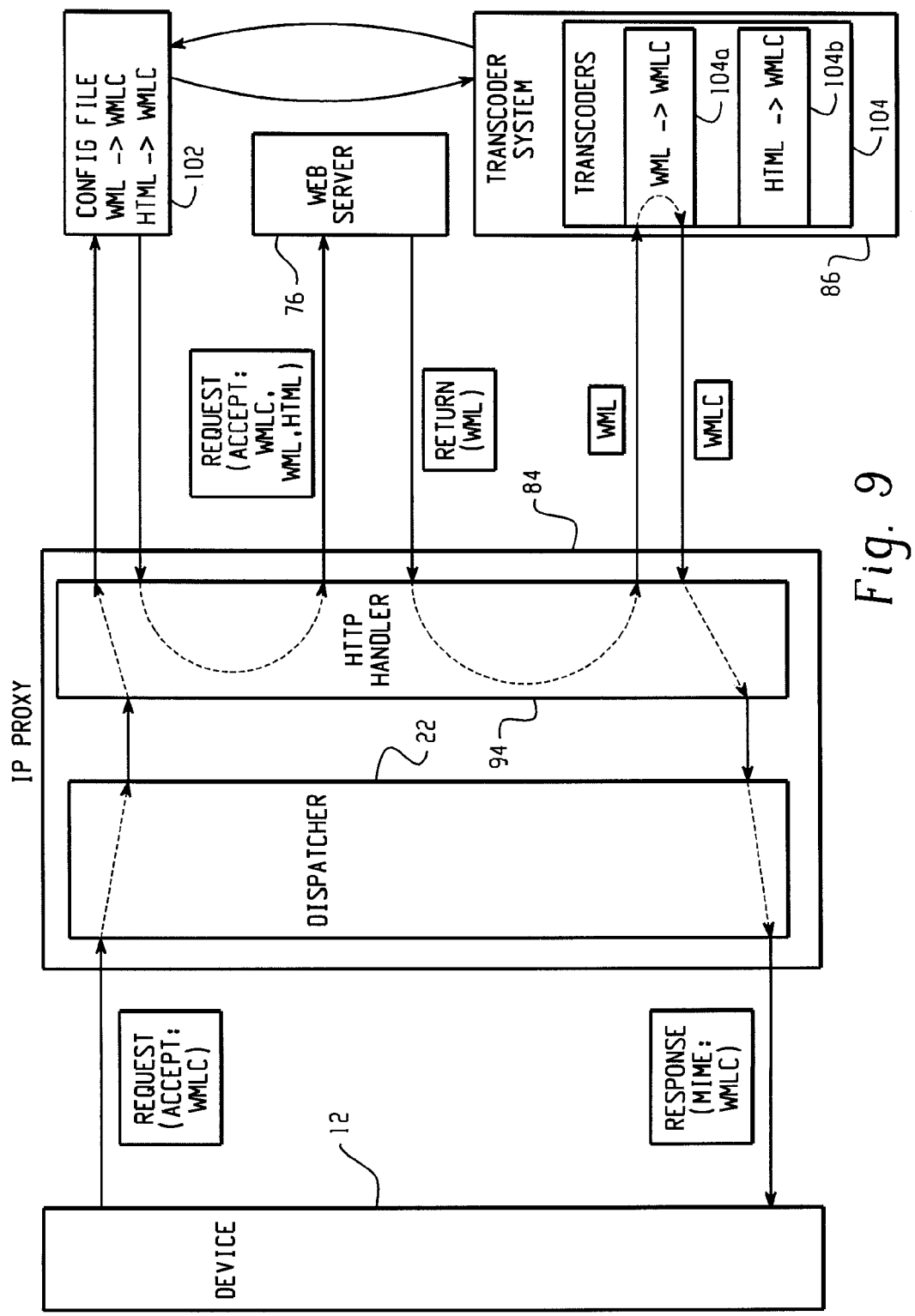
FIG. 9 shows a further signal flow diagram for an external transcoder system.

FIG. 9 shows a further signal flow diagram for an external transcoder system. In FIG. 9, not only the transcoder system 86, but also the configuration file 102 is external to the IP Proxy system 84 and therefore may be shared among multiple IP Proxy systems. Communications between an IP Proxy 84 and the configuration file 102 may be via a direct connection or a network connection, and may be different for different IP Proxy systems. For example, the configuration file 102 may be maintained by an owner or operator of a particular IP Proxy system which is linked to the configuration file by a direct communication, whereas other IP Proxy systems may communicate with the configuration file 102 through local or wide area network connections. As above, the configuration file 102 may instead be implemented as a lookup table. The configuration file 102 may thus be considered a registry, with which one or more external transcoder systems such as 86 register available transcoders.

The operations outlined in FIG. 9 will now be described in detail. When an HTTP request is received by the dispatcher 22 in the IP Proxy system 84, it is forwarded to the HTTP handler 94, which as described above determines if any additional content types can be transcoded into the mobile device-compatible WMLC format. In the example of FIG. 9 however, the configuration file 102 is remote from the IP Proxy system 84. If the configuration file 102 is accessible via HTTP, then the HTTP handler 94 manages the transcoder lookup function with the configuration file 102. If the configuration file 102 is not adapted for HTTP, then a different connection handler may be invoked to facilitate the transcoder lookup or configuration file search.

Depending upon the transcoders available to the IP Proxy 84, the HTTP handler 94 may expand the accepted content types in the request from the mobile device 12 to include the additional content types that may be transcoded into WMLC format acceptable at the mobile device 12. As above, it is assumed that the web server 76 from which content is requested returns WML content to the HTTP handler 94. One embodiment, the transcoding system 86 enables remote transcoding of content. Instead of requesting and loading a WML→WMLC content transcoder from the transcoder system 86, the HTTP handler 94 (or another connection handler, depending on the particular transcoder system and the transfer schemes it supports) transfers the WML content to the transcoding system 86. Within the transcoding system 86, the appropriate WML→WMLC transcoder 104*a* is executed and the WML content is transcoded into WMLC format. The WMLC content is then returned to the HTTP handler 94, or to another connection handler if IP Proxy 84 to transcoder system communications do not use HTTP. When the WMLC content is returned by the transcoding system 86 and received by the HTTP handler 94, possibly through another connection handler which communicates with the transcoding system 86, it is forwarded to the dispatcher 22. The dispatcher 22 then prepares a response including the WMLC content and sends the response to the mobile device 12. The HTTP handler 94 may instead prepare the response, which would then be translated (if necessary) by the dispatcher 22 to conform to a communication protocol or scheme used by the mobile device 12. Illustratively, the WML content returned by the web server 76 may be stored by the HTTP handler 94 in case a data transfer or transcoding error occurs. Local storage of the WML content allows an IP Proxy system 84 to re-submit the content for transcoding, to the same transcoder system 86 or a different transcoder system, without first having to request the content from the web server 76.

In the system of FIG. 9, it is contemplated that the transcoder system 86 and configuration file 102 may also communicate with each other to ensure that the configuration file 102 accurately indicates which transcoders are available. One of the update schemes described above may be used to ensure that the configuration file remains current. A configuration file may be associated with a particular type of connection, such as HTTP connections and thus HTTP connection handlers. If a configuration file 102 is associated with a particular transcoder system 86, then the configuration file may be resident within the transcoding system 86. If multiple transcoding systems are implemented, a shared configuration file storing transcoder entries for the transcoders available in all transcoder systems may simplify the transcoder lookup performed by a connection handler. An IP Proxy system 84 need then only consult a single configuration file to determine if appropriate transcoders are available from any transcoder systems with which it can communicate. This single configuration file/server could also support protocols to allow external transcoding servers to register. This registration process could add a list of available transcoders to the single configuration file, for example.

External transcoder systems 86 therefore include download systems from which transcoders may be downloaded by an IP Proxy system 84 and executed locally (see FIG. 8) and remote transcoding systems to which content is sent for transcoding at the transcoding system (see FIG. 9). In another embodiment, a "hybrid" transcoder system incorporates aspects of both these types of transcoder systems. When a hybrid transcoder system is available to an IP Proxy system 84, the IP Proxy system 84 may either download a required transcoder from the transcoder system or send content to the transcoder system to be transcoded remotely. The selection of transcoder download or remote transcoding may be dependent, for example, upon the amount of data to be transcoded, the complexity of the transcoding (single or chained operations), or other criteria.

External Connection Handler Systems

Figure 10:
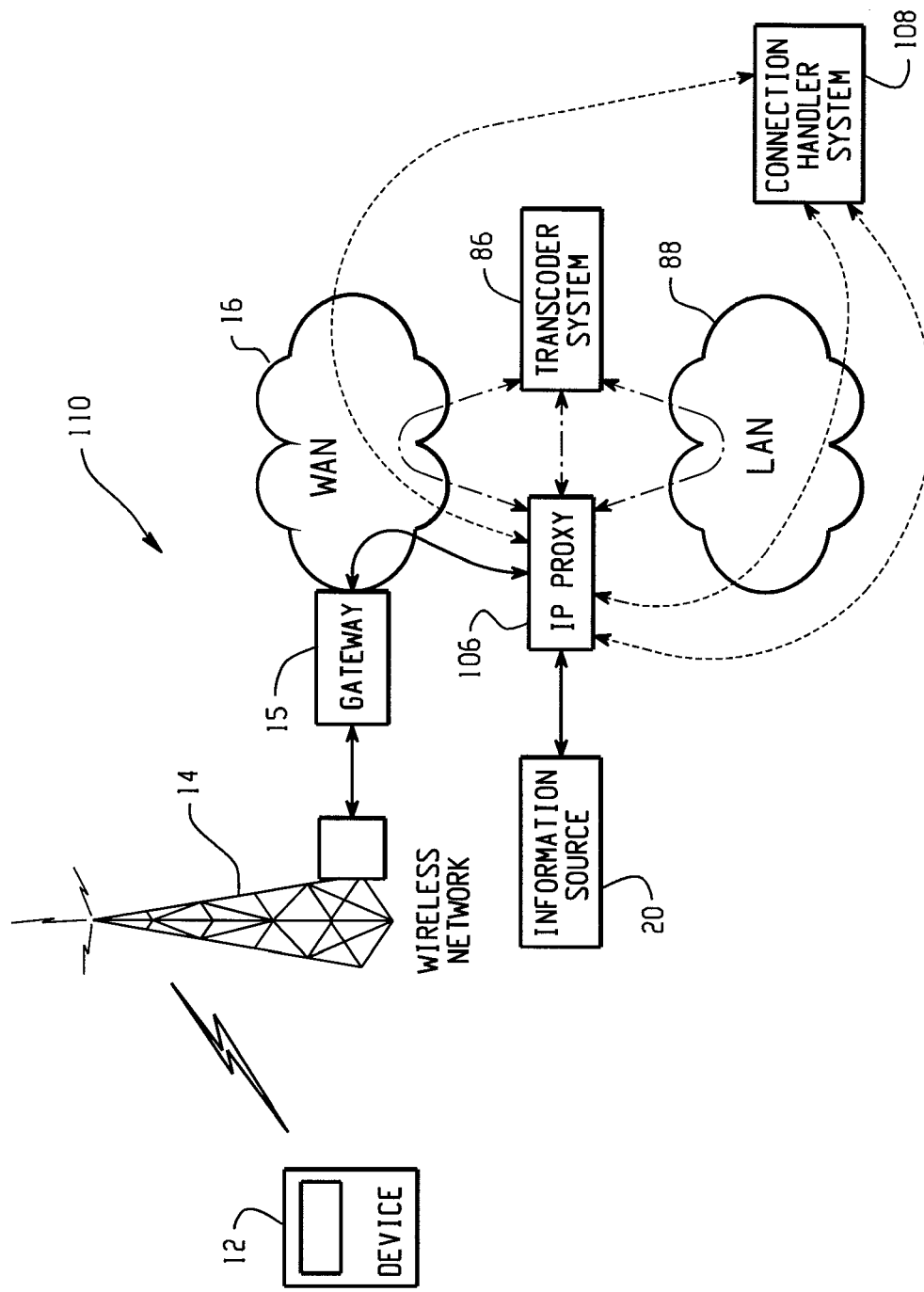
FIG. 10 is a block diagram of a communication system with an external transcoder system and an external connection handler system.

A further extension of the concept of a distributed IP Proxy system with external, possibly shared components is shown in FIG. 10. FIG. 10 is a block diagram of a communication system with an external transcoder system 86 and an external connection handler system 108. The system 110 of FIG. 10 is substantially the same as the system 90 in FIG. 7, except that connection handler system 108 is external to the IP Proxy system 106. The IP Proxy system 106 can download connection handlers from the connection handler system 108 via a direct connection, a LAN 88, or a WAN 16 such as the Internet.

Figure 11:
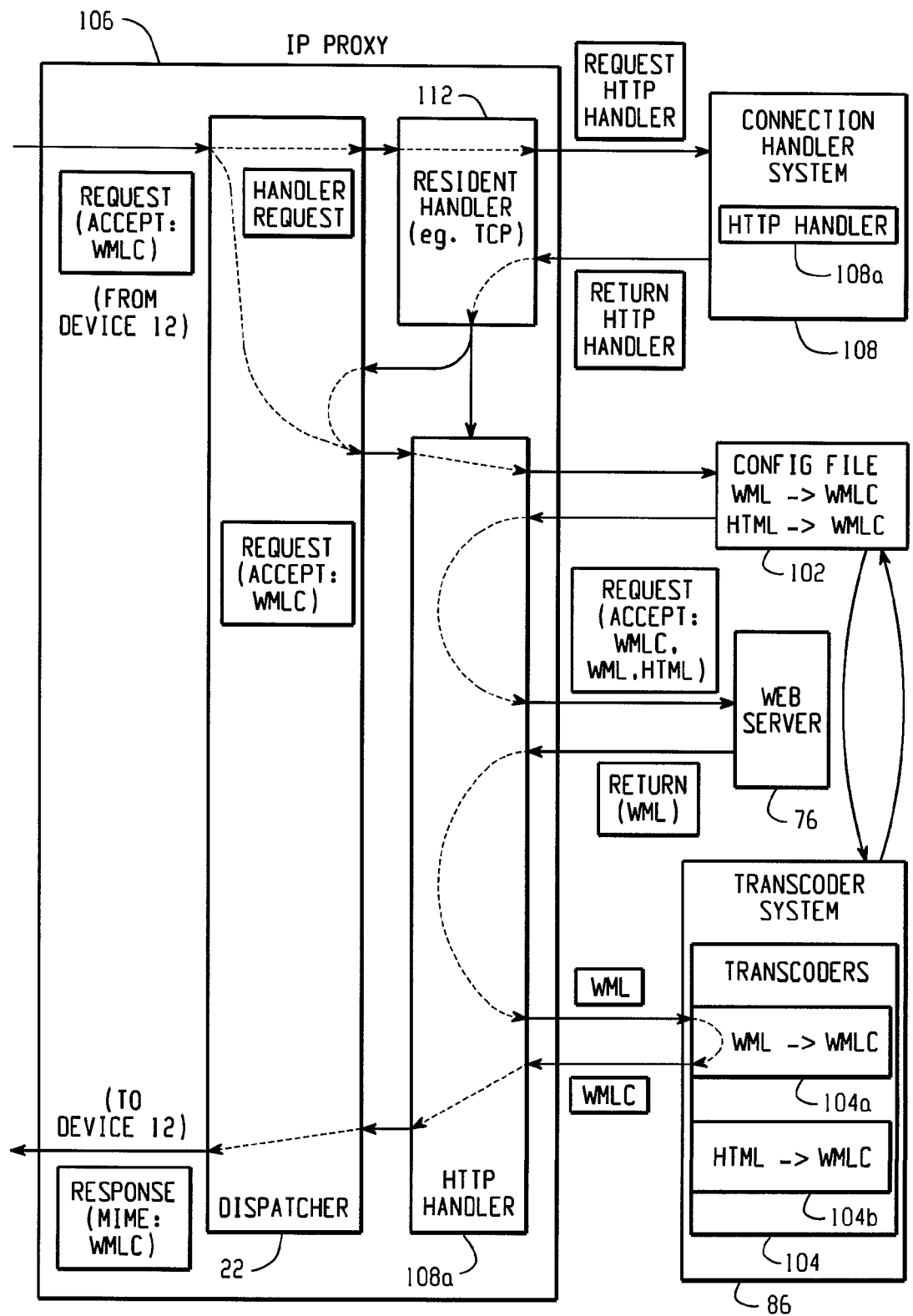
FIG. 11 is an example signal flow diagram for the system of FIG. 10.

FIG. 11 is an example signal flow diagram for the system of FIG. 10. In FIG. 11, the connection handler system 108, the transcoder system 86, and the configuration file 102 are all external components and therefore may be shared among multiple IP Proxy systems 106. These external components may be implemented for access by all IP Proxy systems 106 owned and/or operated by a company, an Internet Service Provider (ISP) or an Application Service Provider (ASP) for example, such as through a company intranet, dial-up connection or other communication arrangement. The connection handler system 108, the transcoder system 86, and the configuration file 102 might instead be publicly accessible to any IP Proxy 106 through the Internet. Those skilled in the art will appreciate that an IP Proxy system such as 106 may potentially have access to both private, possibly corporate-, ISP- or ASP-based external components, as well as public connection handler systems, configuration files or transcoder systems. As above, communications between an IP Proxy 106 and external components may be via a direct connection or a network connection, and may be different for different IP Proxy systems.

By way of example, the operations associated with a system such as 110 will be described below for an HTTP request. When an HTTP request is received by the dispatcher 22 in the IP Proxy system 106, an appropriate handler may have to be downloaded from the connection handler system 108, unless the handler is already resident on the IP Proxy 106 as described in further detail below. This is shown in FIG. 11 as a handler request, which may be processed through a resident handler 112 such as a TCP handler that is compatible with the connection handler system 108. This resident handler 112 will normally be provided locally on an IP Proxy system 108 in order to enable communication between an IP Proxy system and an external connection handler system 108. However, the handler may instead be downloaded by an IP Proxy system 106 from a connection handler system, preferably through an automated download procedure.

The handler 112 then requests the appropriate connection handler, an HTTP connection handler in this illustrative example, from the external connection handler system 108. If the required connection handler is unavailable or cannot be downloaded, then an error may be returned to the mobile device 12. If the required HTTP connection handler 108a is returned by the connection handler system 108 however, it is loaded by the IP Proxy system 106. The dispatcher then forwards the original HTTP request from the mobile device 12 to the HTTP handler 108a. The HTTP handler 108a may determine whether any additional content types can be transcoded into the mobile device-compatible WMLC format. As described above, this determination may be made by performing a transcoder lookup in a local configuration file or lookup table or external configuration file 102 or lookup table. If the configuration file 102 is accessible via HTTP, then the HTTP handler 108a manages the transcoder lookup; otherwise, a different connection handler may be invoked, possibly after a further connection handler download operation, to facilitate the transcoder lookup or configuration file search.

Depending upon the result of the transcoder lookup, the HTTP handler 108a may expand the accepted content types in the request from the mobile device to an information source such as a web server 76. As above, it is assumed that the web server 76 returns WML content to the HTTP handler 108a. The returned WML content may be transcoded into WMLC content by invoking a WML→WMLC transcoder stored in a memory in the IP Proxy system 106, by downloading a WML→WMLC transcoder from an external transcoder system and then invoking the transcoder at the IP Proxy system 106, or by sending the WML content from the IP Proxy system 106 to an external transcoder system 86 for remote transcoding by a WML→WMLC transcoder 104a in the transcoding system 86. Although a single transcoder operation is shown in FIG. 11, chained transcoding operations and any necessary associated downloading or transfer operations may also be performed. When WMLC content is then returned to the HTTP handler 108a, possibly through another connection handler if IP Proxy 106 to transcoder system 86 communications do not use HTTP, a response including the WMLC content is prepared and sent to the mobile device 12 through the dispatcher 22.

The external connection handler system 108 provides for an extension of the types of connection through which an IP Proxy system 106 may access data to be sent to a mobile device 12. Once downloaded from an external connection handler system, a connection handler such as HTTP handler 108a may be stored by an IP Proxy system 106 to a local data store. In such systems, the dispatcher 22 would preferably access the local store to determine if a required handler is already resident within the IP Proxy system 106. Subsequent downloads for previously used connection handlers can thereby be avoided. Download operations may be further reduced by providing one or more of the most commonly used connection handlers in a local memory on initialization of an IP Proxy system 106, such that only less frequently used connection handlers are downloaded from an external connection handler system as needed.

Similar to the external transcoding system described above, an external connection handler system may be either a download system, as shown in FIG. 11, or a remote connection handling system, in which connection handlers are invoked and executed on the connection handler system instead of being downloaded for execution on the IP Proxy system 106. In the example of an HTTP request, when remote connection handling is enabled, a request from the mobile device 12 may be either delegated or handed off to the external connection handler system.

Figure 12:
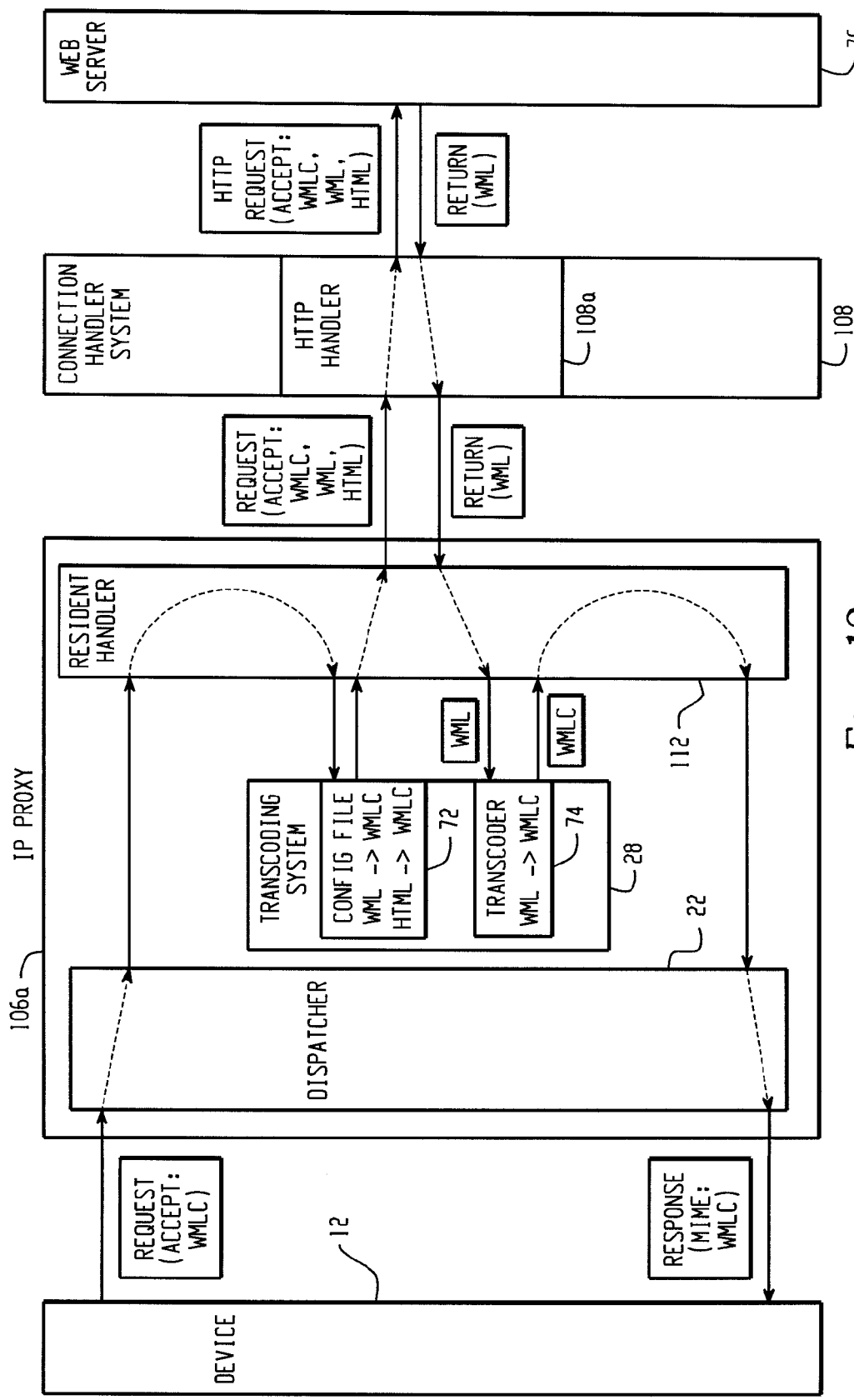
FIG. 12 is a signal flow diagram illustrating delegation of an information request to an external connection handler.

FIG. 12 is a signal flow diagram illustrating delegation of an information request to an external connection handler. In the example of FIG. 12, a request from the mobile device 12 is received by the dispatcher 22 in the IP Proxy system 106a and forwarded to the resident handler 112. Although referred to as a resident handler, the handler 112 may have been downloaded to the IP Proxy system 106a from an external connection handler system. The resident handler 112 may then consult a transcoder configuration file 72 and extend the accepted content types in the request. It will be apparent from the foregoing description that an external configuration file may also be implemented. The resident handler 112, which as described above is compatible with the connection handler system 108, forwards the request, possibly having an extended Accept line, to the connection handler system 108. The connection handler system 108 determines that the request is an HTTP request and invokes the HTTP connection handler 108a. The request is thereby delegated to the external handler 108a, which sends an HTTP request to the information source, in this example the web server 76, and receives returned WML content. The WML content is then returned to the resident handler 112, which transcodes the WML content into mobile device-compatible WMLC content using a WML→WMLC transcoder 74. This transcoding could instead involve chained transcoders and/or external transcoders as described above. The resultant WMLC content is then returned to the mobile device 12 via the dispatcher 22.

Figure 13:
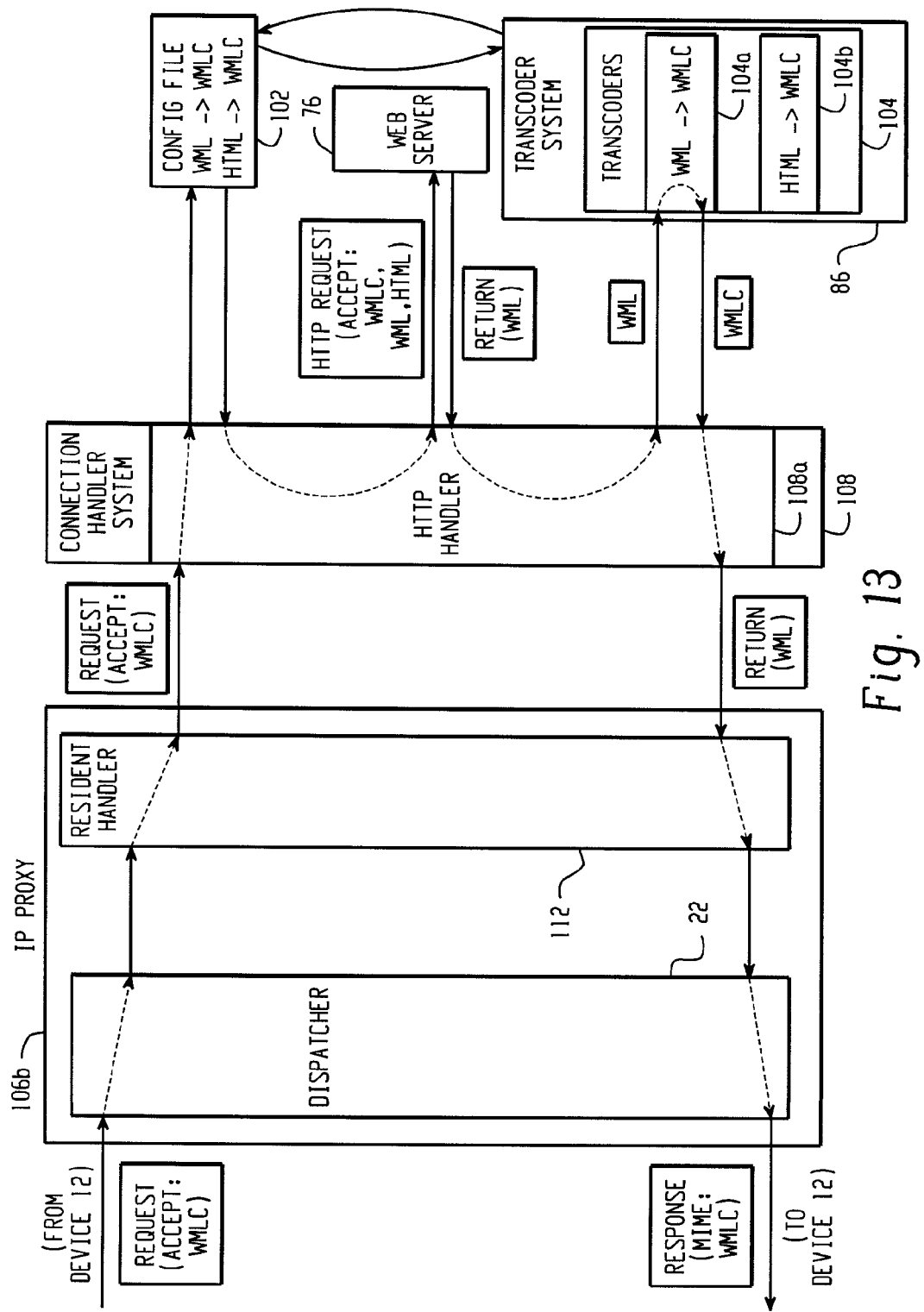
FIG. 13 is a signal flow diagram showing a variation of the request delegation of FIG. 12.

In FIG. 12, extension of accepted content types and content transcoding is managed within the IP Proxy system 106a. FIG. 13 is a signal flow diagram showing a variation of the request delegation of FIG. 12. In FIG. 13, a request from the mobile device 12 is forwarded to the resident handler 112 by the dispatcher 22. The resident handler 112 then forwards the request to the connection handler system 108, which starts the HTTP handler 108a. The HTTP handler 108a consults the configuration file 102 or lookup table to determine which if any transcoders may be available to transcode other content types into the requested type, WMLC, and then modifies the request to include these other content types, WML and HTML in this example. The modified request is sent to the web server 76, which returns WML content. The returned WML content is then sent to an appropriate WML→WMLC transcoder 104a in a transcoder system 86, and the transcoded content is returned to the HTTP handler 108a and then to the resident handler 112 in the IP Proxy system 106a. A response including the WMLC content is sent to the mobile device from the handler 112 through the dispatcher 22 to complete the operation.

Figure 14:
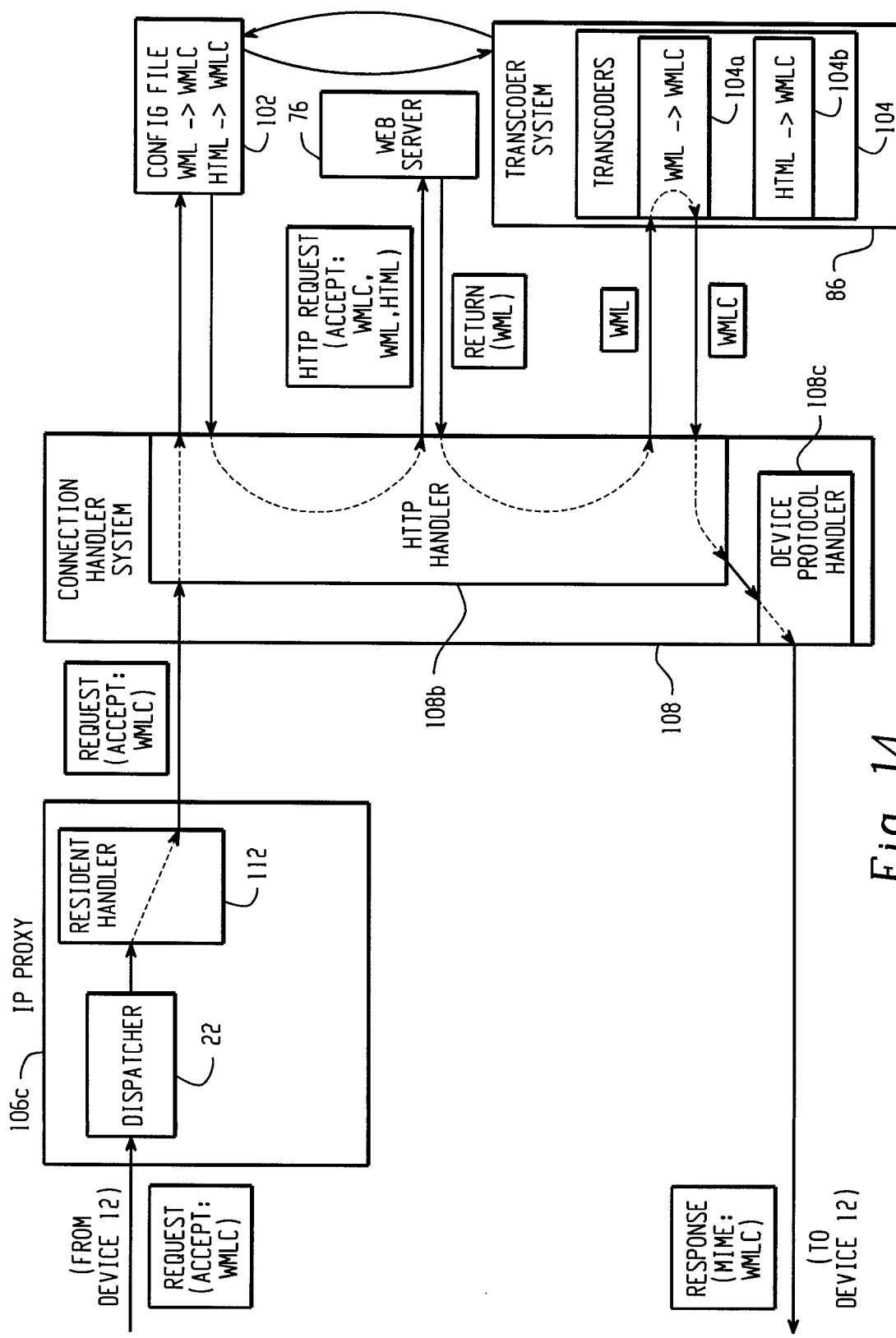
FIG. 14 is a signal flow diagram showing hand-off of a request to an external connection handler.

FIG. 14 is a signal flow diagram showing hand-off of a request to an external connection handler. In a hand-off scheme, the IP Proxy system 106c forwards the request via its resident handler 112 to the external handler system 108. The connection handler system 108 and the appropriate handler, HTTP handler 108b in this example, then manage the remainder of the information request/response operation. Once the request is handed off to an external connection handler system, the IP Proxy system 106c preferably has no further involvement in the operation.

Referring now in detail to FIG. 14, a request from the mobile device 12 is sent to the connection handler system 108. The connection handler system 108 invokes the appropriate handler illustratively HTTP handler 108a, which may modify the request to include further content types and sends the request to the information source (web server 76), receives content from the information source, and invokes any required transcoding operations in the external transcoding system 86, substantially as described above in conjunction with FIG. 13. Instead of returning the transcoded WMLC content to the IP Proxy system 106c however, the external connection handler system preferably includes a mobile device protocol handler 108c, which sends a response to the mobile device 12.

When a mobile device protocol is different than the request protocol such that different handlers are invoked for communication with an information source and the mobile device as shown in FIG. 14, the HTTP handler 108b and the mobile device protocol handler 108c are effectively chained, similar to transcoder chaining described above. Although shown as part of the same connection handler system 108, the HTTP handler 108b and mobile device protocol handler 108c may instead be associated with different connection handler systems. The connection handler system 108 may, for example, download the mobile device protocol handler 108c from another connection handler system or invoke the mobile device protocol handler at the remote system. It will be apparent from the foregoing description that the mobile device protocol handler 108c in FIG. 14 is functionally similar to the dispatcher 22 in that it translates between connection handler and mobile device communication protocols when necessary.

Connection handlers in the same or different connection handler systems may also be chained in order to process an information request from mobile device 12, for example to request the information from an information source or to manage transcoding of returned content. Any connection handler chaining operations may involve delegation or hand-off, and may preferably be controlled by either a connection handler system or an IP Proxy system at which a request was originally received.

It is also contemplated that more than one connection handler system may be available to any IP Proxy system. As described above for external transcoder systems, external connection handler systems may be registered in one or more registries that may be consulted by an IP Proxy system to find available connection handlers. Where connection handler chaining is required, connection handler systems may also access the registry to locate a particular type of connection handler in another connection handler system. A registry scheme would also simplify dynamic connection handler management by facilitating discovery functionality to allow IP Proxy systems and connection handler systems to discover new connection handlers and systems as they become available. In systems with multiple external connection handler systems, an IP Proxy system may effectively become a load balancing module that may distribute incoming mobile device requests among different connection handlers.

Connection handlers have been described above primarily in the context of communication or connection protocols. However, it also contemplated that handlers may be implemented for other functions or services, including for example encryption, compression, user authentication, and state management. Such "service handlers" may possibly be embedded with connection handlers, but would preferably be distinct modules that may be chained with connection handlers as needed. A chaining mechanism provides for more flexibility in connection management and request processing in that a basic connection handler may be chained with as many service handlers as desired to customize a connection or request/response operation. A connection handler system may include service handlers, and may also or instead accomplish connection handler and service handler chaining through downloading or remote execution of service handlers in one or more further service handler systems.

Example Implementation

Figure 15:
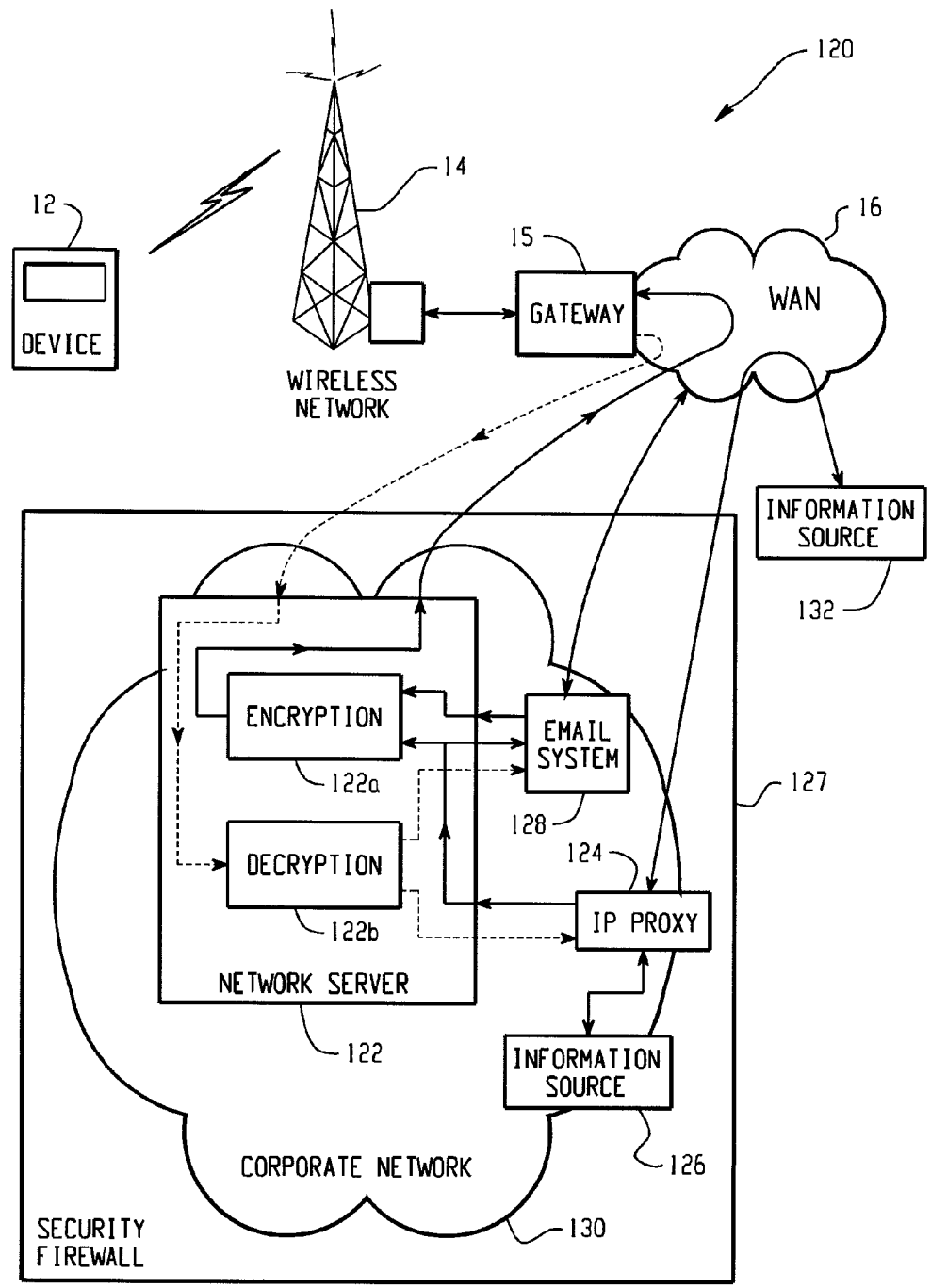
FIG. 15 is a block diagram showing an IP Proxy system implemented in a secure network.

An example implementation of an IP Proxy system will now be described. FIG. 15 is a block diagram showing an IP Proxy system implemented in a secure network.

The system 120 in FIG. 15 includes a mobile device 12 that operates within a wireless network 14. Through a gateway 15, the mobile device can receive and preferably also send data over a WAN 16 such as the Internet. These elements of the system 120 are substantially the same as similarly labelled elements in FIG. 1. In the system 120 however, the IP Proxy system 124 is configured within a private network such as a corporate network 130, behind a security firewall 127, and communicates with the gateway 15 through a network server computer 122. In a particular example embodiment, the network server 122 is associated with an email system 128. Two information sources, an internal source 126 and an external source 132, are also shown in FIG. 15.

The network server 122 preferably enables secure communication to the mobile device 12, as indicated by the encryption and decryption blocks 122a and 122b. The network server 122 encrypts any communications directed to a mobile device 12. The intended recipient mobile device 12, using a secret key stored therein, can decrypt encrypted communications from the network server 122. A mobile device 12 similarly encrypts any information sent to the network server 122, which can be decrypted by the decryption module 122b. Those skilled in the art of cryptography will appreciate that the keys and encryption algorithms used at the network server 122 and mobile device 12 are preferably chosen so that it would be computationally infeasible to decrypt encrypted information without the required secret key. One preferred encryption scheme is triple-DES (Data Encryption Standard).

Key distribution between a network server 122 and a mobile device 12 may be accomplished via a secure connection such as a secure physical connection between the mobile device 12 and the network server 122, or between the mobile device 12 and another computer within the corporate network. Known public key cryptography techniques may instead be used for key distribution. In a public key scheme, a public key is used to encrypt information in such a way that the encrypted information may be decrypted using a corresponding private key. The public key is stored by, and may be retrieved from, a publicly accessible key repository commonly referred to as a certificate authority or CA, whereas the private key is stored only at a mobile device or system with which the public key is associated. Thus, a network server 122 or any other sender that wishes to send encrypted information to a mobile device 12 may retrieve the mobile device's public key from a CA and use the public key to encrypt information destined for the mobile device 12. A mobile device 12 may similarly obtain a network server's public key from a CA and use the public key to encrypt communication signals to be sent to the server.

Regardless of the particular key distribution scheme and encryption techniques used, encrypted communications between a mobile device 12 and network server 122 may be used, for example, where corporate or other private information is to be accessed using a mobile device. Consider the example of the internal information source 126 within the security firewall 127, described below with reference to FIG. 16, which is a signal flow diagram illustrating a corporate data access operation. In keeping with the above illustrative example operations, FIG. 16 shows an HTTP-based data access operation.

Figure 16:
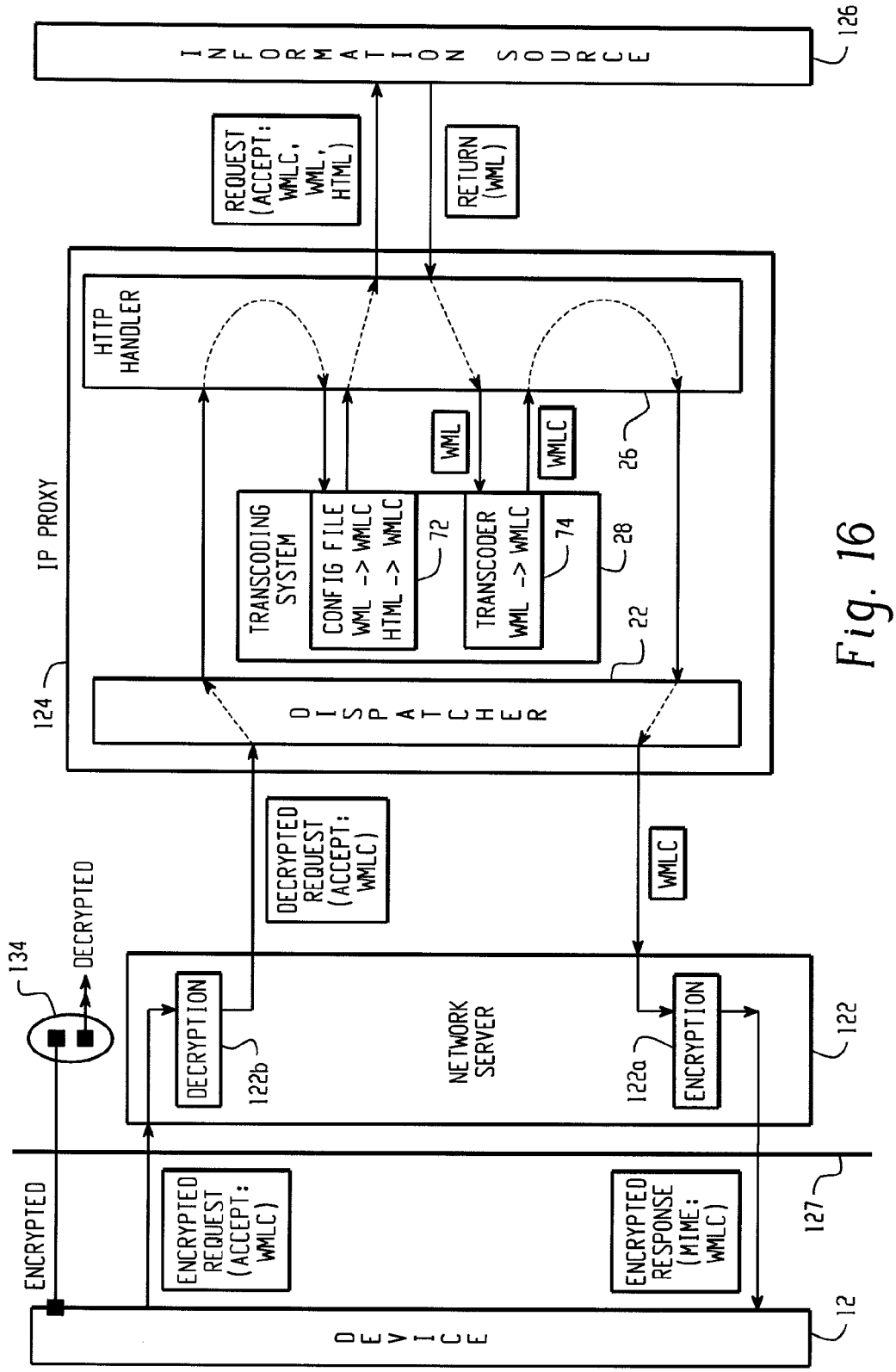
FIG. 16 is a signal flow diagram illustrating a corporate data access operation.

In FIG. 16, an HTTP request is encrypted at the mobile device 12, preferably using a strong encryption routine such as triple-DES (3DES), before it is sent to the network server 122 through the wireless network 14 of FIG. 15 and possibly other intermediate networks or components, such as the gateway 15 and WAN 16 shown in FIG. 15. The encrypted request is then received by the network server 122 and decrypted in the decryption module 122b. The decrypted request is forwarded to the IP Proxy system 124, which may proceed to process the request substantially as described above. The active handler, the HTTP handler 26 in this example, may consult the configuration file 72 or transcoder lookup table and expand the accepted content types to include content types that can be transcoded into the format(s) that can be accepted by the mobile device 12. A request, possibly including further content types, is then sent by the HTTP handler 26 to the information source 126, which then returns requested information, in WML format in this example. An appropriate transcoder 74 is loaded and invoked by the HTTP handler 26 if necessary and the requested content, preferably in a format requested by the mobile device 12, is returned to the network server 122 through the dispatcher 22. The network server 122 then encrypts the content received from the IP Proxy system 124 in its encryption module 122a and sends the encrypted content in a response to the mobile device 12. In some implementations, the protocol conversion or translation operations associated with the dispatcher may instead be performed by the network server 122.

The information source 126 may be a computer system or data store preferably configured for operation on the private network 130, such as a file server or other data store accessible through the network 130. In the example of a corporate network, the information source 126 may include confidential or otherwise sensitive information that an owner of the network 130 strives to keep private. The security firewall 127 is intended to prevent unauthorized access to private network components including the information source 126. In some situations, the very existence of information stored at the information source must remain confidential. The encryption of the request from the mobile device as shown in FIG. 16 prevents an unauthorized party from determining the contents of the request without breaking the encryption, which as described above is not computationally feasible for strong encryption schemes such as 3DES. The request remains encrypted until received by the network server 122 and decrypted, behind the security firewall 127, as indicated at 134 in FIG. 16. The request is therefore virtually as secure as a request sent from a computer system on the network 130.

Once decrypted, the request is processed by the IP Proxy 124 and information source 126 as described above. However, encryption of the requested content by the encryption module 122a in the network server 122 before it is sent to the mobile device 12 similarly ensures that the content can only be viewed by the mobile device 12. Confidential corporate information therefore remains encrypted and thus secure until received and decrypted at the mobile device 12, thereby effectively extending the security firewall 127 to the mobile device 12. Both the request and the information returned to the mobile device in response thereto are secure.

In known remote data access schemes such as WAP, gateway systems which provide for data access using mobile devices are normally located outside corporate or private premises, at the location of a service provider for example. Any confidential or sensitive information encrypted at the private premises is decrypted at the gateway system, outside the corporate firewall, and then re-encrypted before being sent to the destination mobile device or devices. The information is therefore in the clear at the gateway system and thus accessible by an owner or operator of the gateway system. Furthermore, the owner or operator of a private network from which the information was sent typically has no control over security arrangements at the gateway system, such that the information is vulnerable to attacks on the gateway system.

The arrangement shown in FIGS. 15 and 16 wherefore provides secure remote access to private, confidential or otherwise sensitive information. Information is encrypted from end-to-end between the network server 122 and any mobile device 12. Any level of security may be implemented at the security firewall 127 to protect confidential information stored at an information source such as 126, and when encrypted by the network server 122, information is not decrypted at any intermediate point before being received at a mobile device 12. The information is in the clear only "inside" the point 134, behind the security firewall 127, and on the mobile device 12. Security arrangements such as password or passphrase control are also preferably implemented at the mobile device 12 to prevent an unauthorized user from using the mobile device or decrypting received encrypted information. For example, computer workstations may be protected by password-deactivated system locking and access to a corporate network 130 is normally protected by login passwords. Similarly, a password may be required to use a mobile device 12, while a different passphrase may be necessary to decrypt any encrypted information stored on the mobile device 12. A mobile device 12 and information stored thereon is thereby just as secure as a network workstation and information stored on a network. Such techniques as limited password or passphrase entry retries, mobile device 12 or mobile device memory reset after a predetermined number of failed password/passphrase entries, dynamic and possibly random password/passphrase updates and the like may be used to further improve mobile device security.

For an external information source 132 (FIG. 15), a data access operation is substantially the same as shown in FIG. 16, except that the information source is outside the firewall 127. The request and response exchange between the mobile device 12 and the network server 122 may be encrypted, but information exchanged with the information source 132 may be unsecure. If the information provided by the information source 132 is not private or confidential, then unsecure exchange between the IP Proxy system 124 and the source 132 will be sufficient for most purposes.

One possible measure to improve the security of information being requested from an external source 132 is to secure the communications between the IP Proxy system 124 and the source 132. For example, the IP Proxy system 124 may be adapted to support Secure HTTP (HTTPS), Secure Sockets Layer (SSL) or other secure communication schemes in order to securely access information at the information source 132. Information from the source 132 may thereby be securely transferred to the IP Proxy system 124 and is then protected by the security firewall 127. Encrypted information may be decrypted by the IP Proxy system 124, by the active connection handler for example, and transferred to the network server 122, which then encrypts the information for transmission to the mobile device 12. As above, information is only in the clear behind the firewall 127. Alternatively, a secure communication session may be established between the mobile device 12 and source 132 through the IP Proxy 124. In the system of FIG. 15, communications between the mobile device 12 and network server 122 would then be double-encrypted.

As shown in FIG. 15, the network server 122 is also associated with the email system 128. In one embodiment, the network server 122 provides for sending data items from the email system 128 to mobile device 12. One such system is described in detail in U.S. Pat. No. 6,219,694, entitled "System And Method For Pushing Information From A Host System To A Mobile Data Communication Device Having A Shared Electronic Address", and issued to the assignee of the present application on Apr. 17, 2001. The complete disclosure of this patent is hereby incorporated into this application by reference.

Since the network server 122 is also associated with the IP Proxy system 124, integrated functionality between the email system 128 and the IP Proxy system 124 may be possible. For example, the IP Proxy system 124 may use encryption functionality of the network server 122 as well as a transport mechanism via which the network server 122 communicates with the mobile device 12. Other functions of the network server 122, such as data compression, for example, may similarly be exploited by an IP Proxy system 124 to improve the efficiency of use of wireless communication resources. As described briefly above, content destined for a mobile device 12 may be addressed to the mobile device using an email address in the email system 128 associated with the mobile device user. In this example, content forwarded to the mobile device by the IP Proxy system 124 may also be stored in the user's mailbox on email system 128 by the network server 122, as indicated in FIG. 15, to thereby provide both a record of IP Proxy operations and a stored copy of any forwarded content. Other integrated functions may include but are in no way limited to email-based content requests from mobile devices and addressing of mobile device-destined information by the IP Proxy system 124 using an email address on the email system 128. Still further integrated functions may be enabled where a network server 122 or the IP Proxy system 124 is associated with any other services.

It will be appreciated that the above description relates to preferred embodiments by way of example only. Many variations on the invention will be appreciated by those knowledgeable in the field, and such variations are within the scope of the invention as described, whether or not expressly described. For example, embodiments of the invention have been described primarily in the context of an IP-based system. Similar proxy systems for other types of communication systems are also contemplated within the scope of the invention. Other types of connections, connection handlers and transcoders than those described above will also be apparent to those skilled in the art.

Depending upon the particular implementation of a remote data access system and the features to be supported, not all of the elements shown in FIG. 2 are required. Where push services are not supported for example, the proxy system will not include push services 30.

The invention is also in no way limited to content type indication using MIME types. MIME types are useful in conjunction with the instant invention, but are not required to practice the invention. Other content type indicators may be substituted for MIME type to indicate the type or format of requested or received content.

Although the transcoders described above convert between well-known information types or formats, custom transcoders could be developed and implemented for virtually any information format, including for example application program file types and proprietary formats. As described above, a proxy system in accordance with the instant invention is preferably configurable and new content transcoders may be added.

It is also possible that information content from an information source may include multiple different content types, not just a single content type as described above. For such multiple-type content, transcoders may be selected, for example, to transcode the content into a single content type, or into multiple content types accepted at a mobile device. Selection of transcoders may be controlled according to any of the transcoder selection schemes described above. In the case of transcoder selection by a mobile device or information source, a list of transcoders for any or each part of multiple-type information type content may be specified in a connection request, a response to a request, or a push request. A respective transcoder may be selected and used for each part of the information content having a particular content type.

When any part of multiple-type information content cannot be transcoded as desired or required, where a suitable transcoder is not available for example, only other parts of the information content might be transcoded and sent to a mobile device. Alternatively, a default transcoding operation as described above may be used to transcode parts of multiple-type content. Non-transcoded parts of multiple-type content, or possibly all of the multiple-type content, could instead be replaced with a link or other information that may be used to subsequently access the information content or parts thereof, and sent to a mobile device. Information indicating the multiple content types and/or required or recommended transcoders could also be sent to the mobile device. The information content or parts thereof may then be retrieved by the mobile device by submitting a connection request or possibly further transcoding instructions or an alternate transcoder selection to an IP Proxy system.

Furthermore, a proxy system may be implemented in any network, not only in a corporate network as shown in FIG. 15. Installation of a proxy system in an ISP, ASP, or Virtual Network Operator (VNO) system would provide for secure remote access to network information and secure transfer of information between any network users, including transfers between mobile devices of ISP, ASP or VNO users.

Although the invention has been described in detail with reference to certain illustrative embodiments, variations and modifications exist within the scope and spirit of the invention as described and defined in the following claims.

What is claimed is:

1. A system for providing information content received from an information source over a network via a gateway to a wireless mobile device, comprising:
    a processor-implemented transcoding system configured within a private network and behind a security firewall, the transcoding system having a plurality of transcoders on storage media, each transcoder operable to transcode information content; and
    a processor-implemented connection handler system also configured within the private network and behind the security firewall, the connection handler system having a plurality of connection handlers, each of said connection handlers being specific for a different communication protocol, the connection handler system being operable to receive a connection request from the wireless mobile device via a network server that is also within the private network and behind the security firewall and that decrypts communications from the wireless mobile device, the connection handler system further being operable to select a corresponding connection handler based on the connection request, the selected connection handler being operable to retrieve information content from the information source and to determine if the retrieved information content requires transcoding, the selected connection handler further being operable to select one or more transcoders from the plurality of transcoders to transcode the retrieved information content if transcoding is needed and to send transcoded information content to the network server for encryption and transmission to the wireless mobile device.

2. The system of claim 1, wherein the connection handler system comprises a connection handler directory, the connection handler directory storing connection handler data, the connection handler data comprising a network address specifying the location of a connection handler, the connection handler system being operable to access the location specified by the network address, retrieve the connection handler, and store connection handler data associated with the connection handler in the connection handler directory.

3. The system of claim 1, wherein the connection handler system is operable to receive connection data from the wireless mobile device and the connection data includes accept data indicating an acceptable content type that the wireless mobile device is operable to receive.

4. The system of claim 3, wherein the connection handler is operable to determine a received content type of the information content received from the information source and determine whether the received content type matches the acceptable content type.

5. The system of claim 4 wherein the connection handler is further operable to select one or more transcoders to transcode the information content where the received content type does not match the acceptable content type.

6. The system of claim 1, wherein the transcoding system is operable to generate and store mapping data comprising transcoding chains, each transcoding chain selecting one or more transcoders to transcode the information content from an input content type into an output content type.

7. The system of claim 1, wherein the connection handler is operable to specify a list of content types in order of preference and to provide the list of content types to the information source.

8. The system of claim 1, wherein the system is operable to store on an email system by the network server information content forwarded to the wireless mobile device by the IP proxy system via the network server.

9. The system of claim 3, wherein the connection handler is operable to determine a received content type of the information content received from the information source, to determine an acceptable content type that the wireless mobile device is operable to receive, and to specify one of the transcoding chains to transcode the information content from the received content type into the acceptable content type.

10. The system of claim 3, wherein the connection handler is operable to determine a received content type of the information content received from the information source, to determine an acceptable content type that the wireless mobile device is operable to receive, and to specify the one or more transcoders to transcode the information content from the received content type into the acceptable content type.

11. A method for providing information content received from an information source over a network via a gateway to a wireless mobile device, comprising the steps of:

receiving in a private network behind a security firewall a connection request from a wireless mobile device, wherein the connection request is decrypted by a network server in the private network behind the security firewall;

selecting a particular connection handler from a plurality of connection handlers to establish a connection with the wireless mobile device and to retrieve information content from an information source, each of said connection handlers being specific for a different communication protocol;

determining using the selected connection handler that the retrieved information content requires transcoding and selecting using the selected connection handler one or more transcoders from a plurality of transcoders to transcode the received information content; and sending via the connection handler system the transcoded information content to the network server for encrypting and forwarding to the wireless mobile device via the gateway.

12. The method of claim 11, wherein the connection request identifies the information source.

13. The method of claim 11, further comprising the step of sending an information request to the information source.

14. The method of claim 13, wherein:

the connection request conforms to a first communication protocol; and the information request conforms to a second communication protocol.

15. The method of claim 13, wherein the connection request identifies one or more accepted content types; and the method further comprising the steps of:

determining whether any of the plurality of transcoders are configured to transcode any further content types into any of the one or more accepted content types; and including the one or more accepted content types and the further content types in the information request.

16. The method of claim 15, wherein the step of determining if a received content type of the information content may be transcoded into one or more accepted content types comprises the steps of:

determining whether any of the plurality of transcoders are configured to transcode the received content type into the one or more of the accepted content types; and selecting a transcoder for transcoding the information content into one of the accepted content types where any of the plurality of transcoders are configured to transcode the received content type into the one or more of the accepted content types.

17. The method of claim 15, wherein:

the information content comprises multiple content types; and the step of determining if a received content type of the information content may be transcoded into one or more of the accepted content types comprises the steps of:

determining whether any of the transcoders are configured to transcode any of the multiple content types into the one or more of the accepted content types; and selecting a respective transcoder for transcoding the information content of each of the multiple content types into one of the accepted content types where a plurality of the transcoders are configured to transcode a plurality of the multiple content types into the one or more of the accepted content types.

18. The method of claim 11, wherein the connection request identifies one or more accepted content types, and further comprising the steps of:

searching a configuration file for a set of transcoders configured to transcode information content into the one or more accepted content types;

generating a list of respective input content types corresponding to the set of transcoders; and sending the list of respective input content types and the one or more accepted content types to the information source.

19. The method of claim 11, wherein the plurality of transcoders are stored at a location that is remote from the location where the connection handlers are invoked.

20. The method of claim 11, wherein the plurality of transcoders are invoked at a location that is remote from the location where the connection handlers are invoked.

* * * * *